(12) United States Patent
Venugopal et al.

(10) Patent No.: US 12,261,653 B2
(45) Date of Patent: Mar. 25, 2025

(54) BEAM MANAGEMENT ENHANCEMENTS IN MODEL-BASED CHANNEL TRACKING

(71) Applicant: QUALCOMM Incorporated, San Diego, CA (US)

(72) Inventors: Kiran Venugopal, Raritan, NJ (US); Wooseok Nam, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 17/805,209

(22) Filed: Jun. 2, 2022

(65) Prior Publication Data

US 2023/0397027 A1 Dec. 7, 2023

(51) Int. Cl.
| | |
|---|---|
| *H04B 7/0408* | (2017.01) |
| *H04B 7/06* | (2006.01) |
| *H04B 17/373* | (2015.01) |
| *H04B 17/391* | (2015.01) |
| *H04W 8/22* | (2009.01) |
| *H04W 16/28* | (2009.01) |
| *H04W 24/08* | (2009.01) |
| *H04W 24/10* | (2009.01) |
| *H04W 72/044* | (2023.01) |
| *H04W 72/20* | (2023.01) |

(Continued)

(52) U.S. Cl.
CPC ....... *H04B 17/3913* (2015.01); *H04B 7/0408* (2013.01); *H04B 7/0696* (2023.05); *H04B 17/373* (2015.01); *H04W 8/22* (2013.01); *H04W 16/28* (2013.01); *H04W 24/08* (2013.01); *H04W 24/10* (2013.01); *H04W 72/046* (2013.01); *H04W 72/20* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .. H04B 7/02–12; H04B 17/0082–3913; H04L 1/0001–248; H04L 5/0001–0098; H04W 8/22–245; H04W 16/18–28; H04W 24/02–10; H04W 72/02–569; H04W 76/10–50; H04W 84/02–16; H04W 88/02–12; H04W 92/02–24
See application file for complete search history.

(56) References Cited

U.S. PATENT DOCUMENTS

2023/0291518 A1 * 9/2023 Venugopal ......... H04B 17/3913

FOREIGN PATENT DOCUMENTS

WO WO-2023208363 A1 * 11/2023 ......... H04B 17/3913

* cited by examiner

*Primary Examiner* — Timothy J Weidner
(74) *Attorney, Agent, or Firm* — Procopio, Cory, Hargreaves & Savitch LLP

(57) ABSTRACT

Apparatus, methods, and computer-readable media for facilitating beam management enhancements in model-based channel tracking are disclosed herein. An example method for wireless communication at a first network entity includes receiving from a second network entity, a model configuration indicative of a model condition of a channel between the first network entity and the second network entity for multiple beam pairs. The example method also includes tracking a variation in a channel condition relative to the model condition of the channel based on the model configuration for each of multiple beam pairs separately in multiple tracking sessions that overlap in time. Each beam pair may include a transmission beam and a reception beam.

30 Claims, 12 Drawing Sheets

(51) Int. Cl.
*H04W 84/02* (2009.01)
*H04W 88/02* (2009.01)
*H04W 88/08* (2009.01)
*H04W 92/02* (2009.01)
*H04W 92/10* (2009.01)

BEAM MANAGEMENT ENHANCEMENTS IN MODEL-BASED CHANNEL TRACKING

TECHNICAL FIELD

The present disclosure relates generally to communication systems, and more particularly, to wireless communications utilizing channel variation tracking.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. An apparatus may include a first network entity. The example apparatus may receive, from a second network entity, a model configuration indicative of a model condition of a channel between the first network entity and the second network entity for multiple beam pairs. The apparatus may also track a variation in a channel condition relative to the model condition of the channel based on the model configuration for each of the multiple beam pairs separately in multiple tracking sessions that overlap in time. Each beam pair may include a transmission beam and a reception beam.

In another aspect of the disclosure, a method, a computer-readable medium, and an apparatus are provided for wireless communication. An apparatus may include a second network entity. The example apparatus may output for transmission, one or more model configurations indicative of a model condition of a channel between a first network entity and the second network entity for multiple beam pairs separately in multiple tracking sessions. Each beam pair of the multiple beam pairs may have a separate tracking session of the multiple tracking sessions. The multiple tracking sessions for the multiple beam pairs may overlap in time. The apparatus may also obtain one or more updated parameters for the one or more model configurations for one of the multiple beam pairs based on a variation, observed at the first network entity, of a channel condition in a corresponding tracking session of the multiple tracking sessions.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
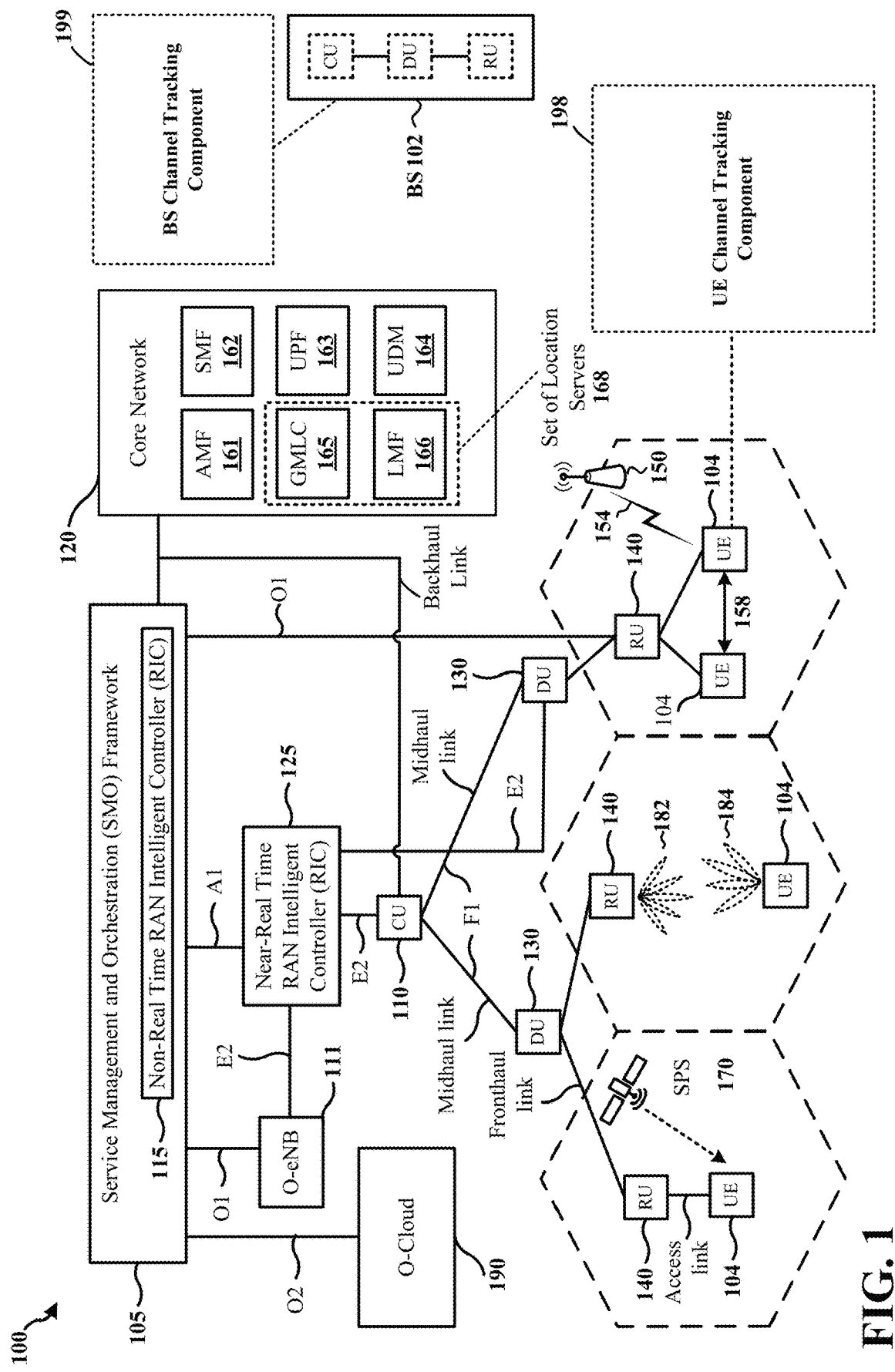
FIG. 1 is a diagram illustrating an example of a wireless communications system and an access network.

The measurement and reporting of channel state information (CSI) may be used to adjust and improve communication, such as communication between a UE and network. In some aspects, such as high mobility situations, performance loss may occur based on channel variations that may occur more frequently than CSI updates. Although the CSI reporting rate can be increased, the increased uplink and downlink CSI overhead may reduce system throughput. Additionally, more frequent measurements, transmissions (e.g., of reference signals), and/or reporting uses additional battery power at a UE. As an example, a UE may transmit SRS to enable uplink based measurements. Aspects presented herein provide for improved CSI feedback and tracking efficiency with less overhead. The aspects presented herein provide a framework for multiple beam tracking and beam management improvements using model based reporting. As an example, a first network entity may receive, from a second network entity, a model configuration indicative of a model condition of a channel between the first network entity and the second network entity for multiple beam pairs, e.g., receiving one or more model configurations for each of the multiple beam pairs. The first network entity may track a variation in a channel condition relative to the model condition of the channel based on the model configuration for each of multiple beam pairs separately in multiple tracking sessions that overlap in time. Each beam pair may include a transmission beam and a reception beam.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs (e.g., a CU 110) that can communicate directly with a core network 120 via a backhaul link, or indirectly with the core network 120 through one or more disaggregated base station units (such as a Near-Real Time (Near-RT) RAN Intelligent Controller (RIC) (e.g., a Near-RT RIC 125) via an E2 link, or a Non-Real Time (Non-RT) RIC 115 associated with a Service Management and Orchestration (SMO) Framework (e.g., an SMO Framework 105), or both). A CU 110 may communicate with one or more DUs (e.g., a DU 130) via respective midhaul links, such as an F1 interface. The DU 130 may communicate with one or more RUs (e.g., an RU 140) via respective fronthaul links. The RU 140 may communicate with respective UEs (e.g., a UE 104) via one or more radio frequency (RF) access links. In some implementations, the UE 104 may be simultaneously served by multiple RUs.

Each of the units, i.e., the CUs (e.g., a CU 110), the DUs (e.g., a DU 130), the RUs (e.g., an RU 140), as well as the Near-RT RICs (e.g., the Near-RT RIC 125), the Non-RT RICs (e.g., the Non-RT RIC 115), and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU 140 can be implemented to handle over the air (OTA) communication with one or more UEs (e.g., the UE 104). In some implementations, real-time and non-real-time aspects of control and user plane communication with the RU 140 can be controlled by a corresponding DU. In some scenarios, this configuration can enable the DU(s) and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs (e.g., the RU 140) and the UEs (e.g., the UE 104) may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UE 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication (e.g., a D2D communication link 158). The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with a UE 104 (also referred to as Wi-Fi stations (STAs)) via communication link 154, e.g., in a 5 GHz unlicensed frequency spectrum or the like. When communicating in an unlicensed frequency spectrum, the UE 104/Wi-Fi AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) (e.g., an AMF 161), a Session Management Function (SMF) (e.g., an SMF 162), a User Plane Function (UPF) (e.g., a UPF 163), a Unified Data Management (UDM) (e.g., a UDM 164), one or more location servers 168, and other functional entities. The AMF 161 is the control node that processes the signaling between the UE 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) (e.g., a GMLC 165) and a Location Management Function (LMF) (e.g., an LMF 166). However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station (e.g., the base station 102). The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a device in communication with a base station, such as a UE 104 in communication with a base station 102 or a component of a base station (e.g., a CU 110, a DU 130, and/or an RU 140), may be configured to manage one or more aspects of wireless communication. For example, the UE 104 may include a UE channel tracking component 198 configured to facilitate beam management of multiple beam pairs associated with model-based channel tracking while also conserving wireless resources and reducing signaling overhead.

In certain aspects, the UE channel tracking component 198 may be configured to receive, from a second network entity, a model configuration indicative of a model condition of a channel between the first network entity and the second network entity. The example UE channel tracking component 198 may also be configured to track a variation in a channel condition relative to the model condition of the channel based on the model configuration for each of multiple beam pairs separately in multiple tracking sessions that overlap in time. Each beam pair may include a transmission beam and a reception beam.

In another configuration, a base station, such as the base station 102 or a component of a base station (e.g., a CU 110, a DU 130, and/or an RU 140), may be configured to manage or more aspects of wireless communication. For example, the base station 102 may include a BS channel tracking component 199 configured to facilitate beam management of multiple beam pairs associated with model-based channel tracking while also conserving wireless resources and reducing signaling overhead.

In certain aspects, the BS channel tracking component 199 may be configured to output for transmission, a model configuration indicative of a model condition of a channel between a first network entity and the second network entity for multiple beam pairs separately in multiple tracking sessions. Each beam pair of the multiple beam pairs may have a separate tracking session of the multiple tracking sessions. The multiple tracking sessions for the multiple beam pairs may overlap in time. The example BS channel tracking component 199 may also be configured to obtain one or more updated parameters for the model configuration for one of the multiple beam pairs based on a variation, observed at the first network entity, of a channel condition in a corresponding tracking session of the multiple tracking sessions.

The aspects presented herein may enable beam management of multiple beams pairs and tracking channel variations, which may facilitate adjusting and improving communication between a UE and network, for example, by conserving wireless resources and reducing signaling overhead.

Although the following description provides examples directed to 5G NR (and, in particular, to channel tracking), the concepts described herein may be applicable to other similar areas, such as LTE, LTE-A, CDMA, GSM, and/or other wireless technologies, in which a UE and network may adjust wireless communication based on channel variations.

Figure 2:
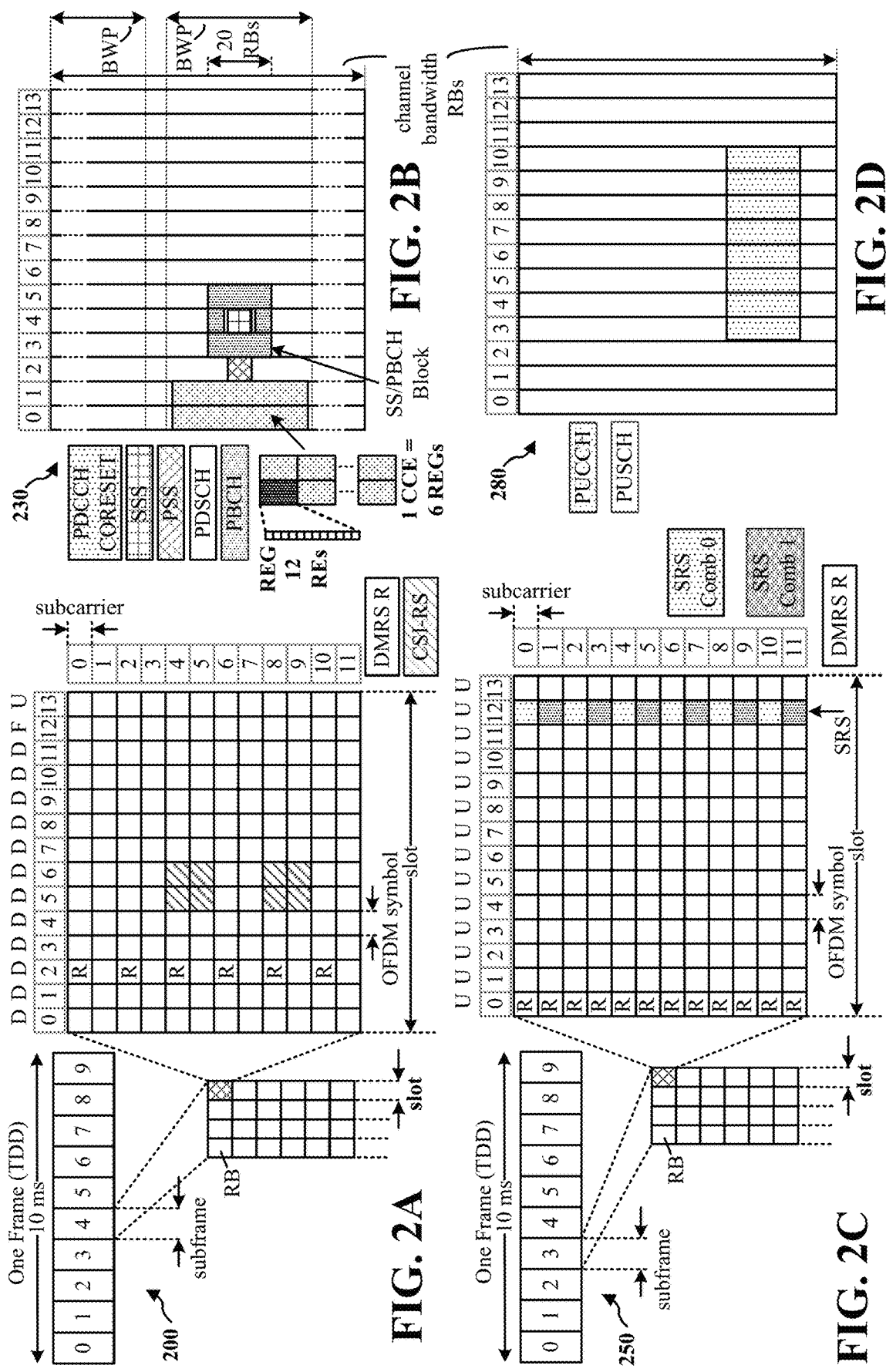
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| $\mu$ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. As shown in Table 1, the subcarrier spacing may be equal to $2^{\mu}*15$ kHz, where $\mu$ is the numerology 0 to 4. As such, the numerology $\mu=0$ has a subcarrier spacing of 15 kHz and the numerology 1.1=4 has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
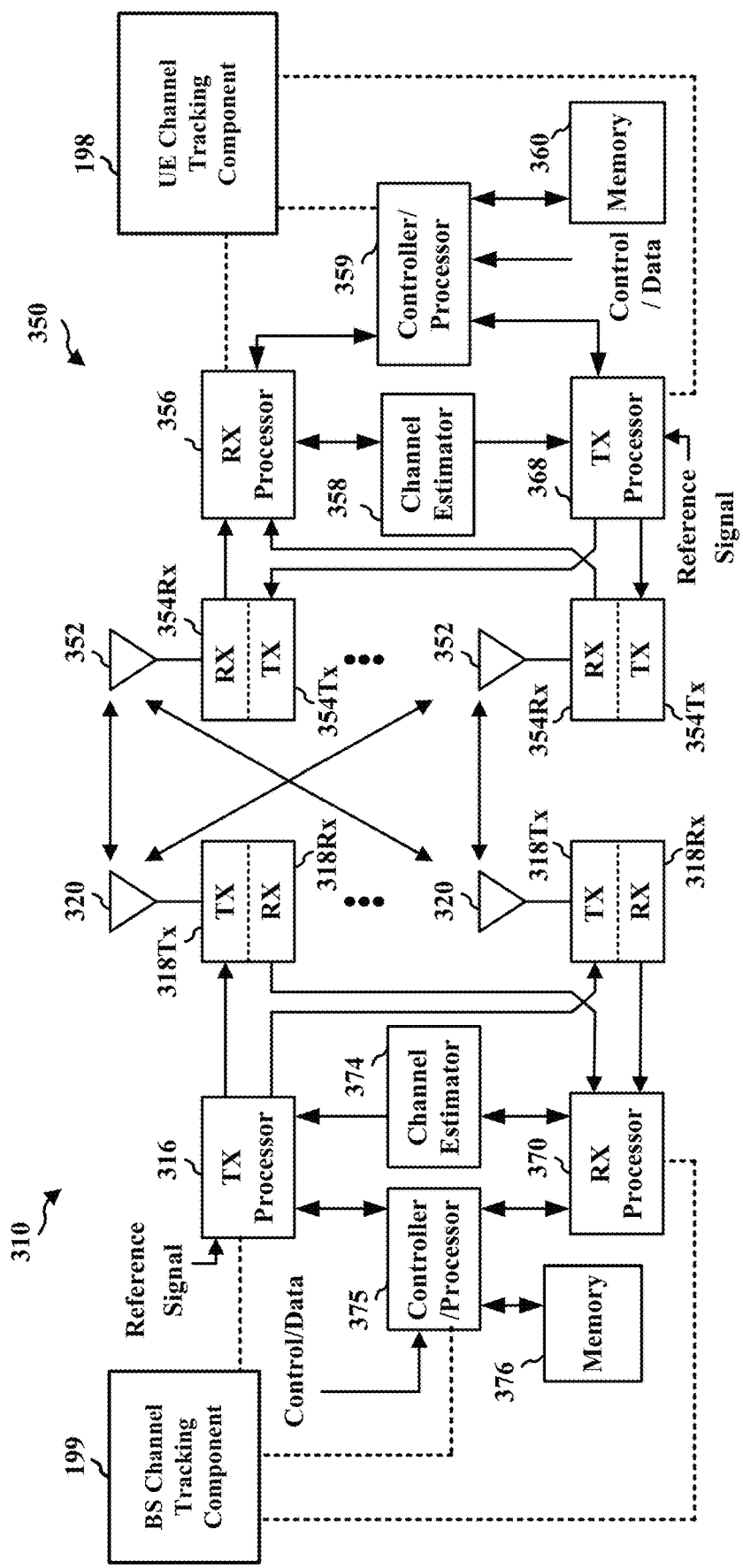
FIG. 3 is a diagram illustrating an example of a base station and user equipment (UE) in an access network.

FIG. 3 is a block diagram that illustrates an example of a first wireless device that is configured to exchange wireless communication with a second wireless device. In the illustrated example of FIG. 3, the first wireless device may include a base station 310, the second wireless device may include a UE 350, and the base station 310 may be in communication with the UE 350 in an access network. As shown in FIG. 3, the base station 310 includes a transmit processor (TX processor 316), a transmitter 318Tx, a receiver 318Rx, antennas 320, a receive processor (RX processor 370), a channel estimator 374, a controller/processor 375, and memory 376. The example UE 350 includes antennas 352, a transmitter 354Tx, a receiver 354Rx, an RX processor 356, a channel estimator 358, a controller/processor 359, memory 360, and a TX processor 368. In other examples, the base station 310 and/or the UE 350 may include additional or alternative components.

In the DL, Internet protocol (IP) packets may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna of the antennas 320 via a separate transmitter (e.g., the transmitter 318Tx). Each transmitter 318Tx may modulate a radio frequency (RF) carrier with a respective spatial stream for transmission.

At the UE 350, each receiver 354Rx receives a signal through its respective antenna of the antennas 352. Each receiver 354Rx recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, two or more of the multiple spatial streams may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna of the antennas 352 via separate transmitters (e.g., the transmitter 354Tx). Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna of the antennas 320. Each receiver 318Rx recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE channel tracking component 198 of FIG. 1.

At least one of the TX processor 316, the RX processor 370, and the controller/processor 375 may be configured to perform aspects in connection with the BS channel tracking component 199 of FIG. 1.

The measurement and reporting of CSI may be used to adjust and improve communication, such as communication between a UE and network. In some aspects, such as high mobility situations, performance loss may occur based on channel variations that may occur more frequently than CSI updates. Although the CSI reporting rate can be increased, the increased uplink and downlink CSI overhead may reduce system throughput. Additionally, more frequent measurements, transmissions (e.g., of reference signals), and/or reporting uses additional battery power at a UE. As an example, a UE may transmit SRS to enable uplink based measurements. Aspects presented herein provide for model based CSI tracking that may address channel variations while also conserving wireless resources and avoiding additional CSI overhead.

Reducing an overhead associated with channel state information (CSI) measurement and CSI reporting may increase a performance of a first network entity, such as a UE, and/or a second network entity, such as a base station or a component of a base station. For example, reducing a number of CSI measurements may increase a system throughput between the first network entity and the second network entity. However, reducing the number of CSI measurements may also reduce a quality of the CSI, as more CSI measurements may provide increased measurement accuracy, but may also increase the overhead. A reduction of the overhead may be advantageous for high mobility use cases, such as for UEs moving at speeds of 30-500 kilometers per hour (kmph), applications associated with Industrial IoT (IIoT) procedures, automotive applications, highway applications, high-speed train applications, etc.

Some Type II CSI feedback procedures may experience a performance loss even at moderate speeds of the UE, such as 10-30 kmph. Performance loss may occur based on a channel variation being too fast for a CSI measurement/update rate (i.e., a frequency at which the CSI measurement and CSI reporting is performed by the UE). By a time that the UE performs the CSI measurement and reports the CSI measurement to the scheduling entity (e.g., second network entity), the CSI report may become outdated. Thus, subsequent transmissions or pre-coding procedures that are based on the CSI measurement and the CSI report may not be accurate. For example, a mismatch may occur between the indicated CSI measurement and the actual channel conditions through which a signal may be propagated. Type II/enhanced TypeII (eType II) procedures for tracking the CSI feedback may also include increased CSI processing times in comparison to Type-I single panel (SP) CSI feedback procedures.

The CSI measurement/update rate may be increased based on a channel variation rate. As an example, a UE may be requested to report the CSI feedback to the network more frequently for tracking an increased variability of the channel. A request for tracking the increased variability of the channel may also be transmitted in the reverse direction. Such requests may generate an increased downlink/uplink resource overhead affecting system throughput (e.g., may decrease system throughput). Additionally, more frequent reporting occasions by the UE may also increase UE battery consumption. Aspects presented herein help to improve CSI feedback and tracking procedures with less associated overhead.

Although the above description describes an example in which the network node requests the UE to report CSI feedback, in other examples, the request for more frequent tracking of a channel, for example, in scenarios associated with increased variability of a channel, may be transmitted in the reverse direction from the UE to the network node.

In some examples, a CSI feedback rate (e.g., performing a CSI measurement and reporting the CSI measurement) may be adjusted at the UE based on a channel coherence time. The channel coherence time may refer to a period during which the channel is assumed to be quasi-static. In such scenarios, the UE may send a CSI report once during the period. When the channel variation and the mobility of the UE is low, the channel coherence time may be large, which may allow the CSI feedback rate to be low. That is, the update rate may be a function of the channel coherence time. A channel that is fast varying may correspond to an increased CSI feedback rate. If the channel coherence time is too short for highly mobile network entities (e.g., UEs) associated with a fast/frequent CSI feedback rate, an adaptive approach based on the channel coherence time may still result in significant signaling configuration (or reconfiguration) overhead, such as when the mobility of the UE is non-uniform. For example, as the mobility changes, multiple configurations and signaling updates may be used to indicate information to the UE and receive CSI feedback from the UE indicative of the mobility of the UE and/or parameters to use for measuring and reporting the CSI feedback. Thus, while such an adaptive approach may avoid or reduce channel tracking being outdated, the configurations needed for providing CSI feedback may need to be dynamically updated frequently, thereby increasing overhead.

In some examples, Doppler domain information associated with the CSI feedback may be used to indicate timing information for frequency domain (FD) codebooks and/or spatial domain (SD) codebooks. For example, Doppler domain compression may be based on a channel correlation time. For mmW communications and higher bands, such as FR2, FR4, etc., the CSI feedback may be compressed in the Doppler domain in addition to the frequency domain and/or the spatial domain. The CSI feedback may be indicative of precoder entries in a Type-II codebook. While such techniques may provide improved channel tracking with less frequent CSI reporting occasions, the codebook size and the reporting overhead may be increased. Additionally, a CSI processing time for each report at the UE may be higher than a processing time for Type-II CSI reporting procedures and/or eType-II CSI reporting procedures.

In some examples, DM-RS based CSI feedback adjustments may be performed based on a PMI and/or an RI/CQI. In addition to tracking the channel based on CSI resources, the DM-RS of scheduled downlink transmissions may be used for adjusting a previous CSI feedback report from the UE. Additional signaling may be performed with the downlink traffic to associate DM-RS resources with previous CSI resources/reports. The channel may be modeled as a time-varying, multi-path complex channel based on a linear combination of narrowband, time-invariant components, with CSI feedback via the PMI, RI, layer indicator (LI), CQI, etc.

While the channel may be modeled in some scenarios as a time-varying wideband channel, a model-based representation of the channel may also be configured to track the channel variation with reduced overhead. In some examples, the model may be updated periodically at a transmitting node and the receiving node such that a same model may be used to predict a future CSI without performing a corresponding measurement. For example, the model may be based on a state-space channel profile where each state may correspond to a sparse representation of the channel in a multi-dimensional space. Procedures associated with the model-based representation of the channel may be similar to a delta CSI update for tracking the channel for CSI feedback, but may be further compressed based on a model configuration communicated between the transmitting node and the receiving node.

Figure 4:
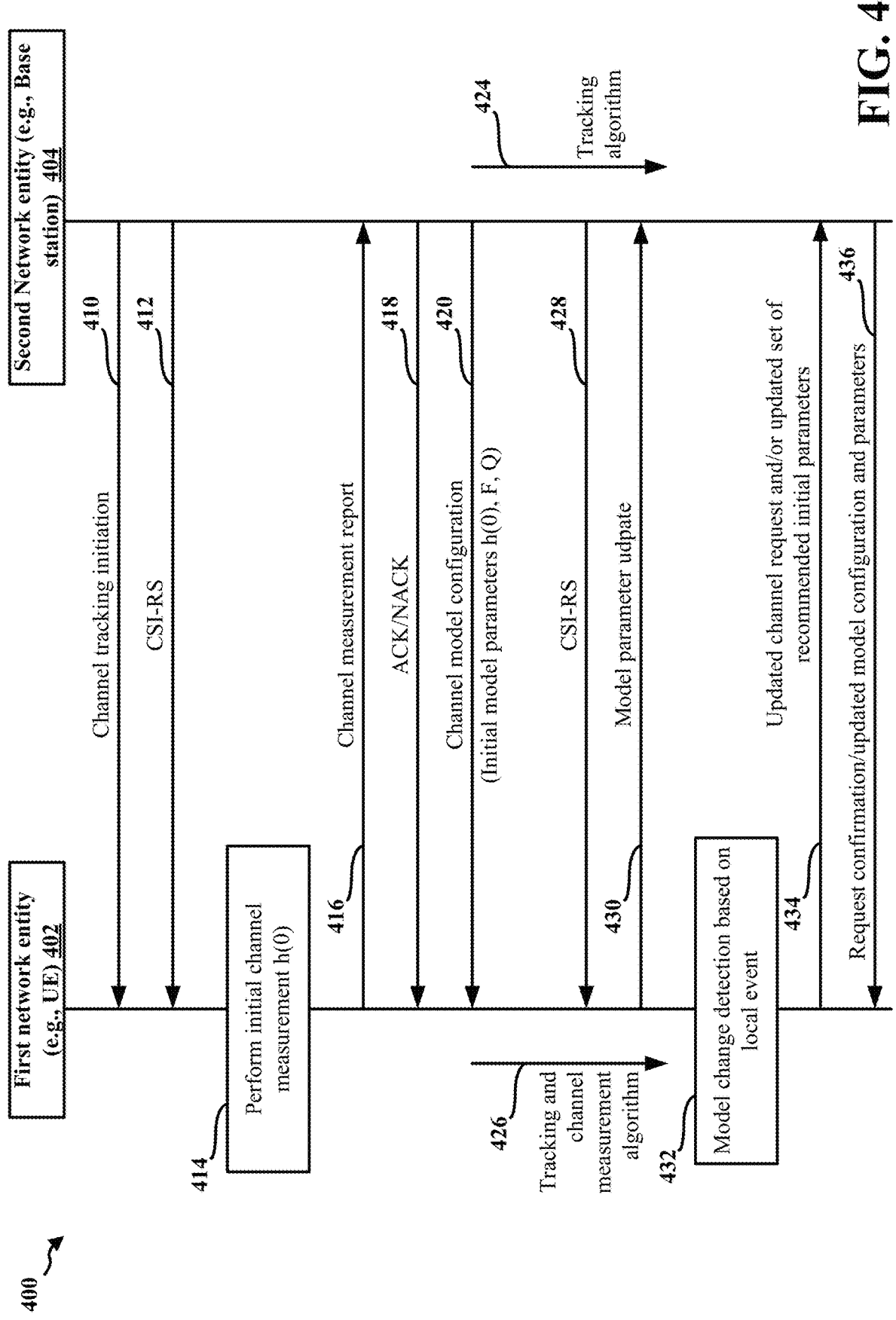
FIG. 4 is a call flow diagram illustrating communications between a first network entity and a second network entity, in accordance with various aspects of the present disclosure.

FIG. 4 is a call flow diagram 400 illustrating a model-based channel representation to more efficiently track channel variation between a first network entity 402 (e.g., a UE) and a second network entity 404 (e.g., a base station) with less overhead. While the channel may be modeled in some cases as a time-varying wideband channel, a model-based representation of the channel may also be configured to track the channel variation with reduced overhead. In some aspects, the model may be updated periodically at the Tx node (e.g., second network entity 404) and the Rx node (e.g., first network entity 402), such that a same model may be used to predict a future CSI without performing a corresponding measurement. For instance, the model may be based on a state-space channel profile where each state may correspond to a sparse representation of the channel in a multi-dimensional space. Procedures associated with the model-based representation of the channel may be similar to a delta CSI update for tracking the channel for CSI feedback, but may be further compressed based on the model configuration communicated, at 420, between the second network entity 404 and the first network entity 402.

The first network entity 402 and the second network entity 404, such as a UE and a base station, may exchange common model information during an initial setup procedure for tracking the channel. For example, at 406, the second network entity 404 (e.g., base station) may transmit/receive a channel model configuration and initial parameters to/from the first network entity 402 (e.g., UE). The channel model configuration may be used by the first network entity 402 and the second network entity 404 to ensure that both nodes are using a same model to predict the CSI.

The first network entity 402 may measure the channel based on a reference signal, e.g., 412 and 428, received from the second network entity 404. The reference signal and corresponding measurement may occur before or after the channel model configuration and initial parameters are communicated, at 420, between the second network entity 404 and the first network entity 402. The reference signal may correspond to periodic CSI-RS, aperiodic CSI-RS, or semi-persistent CSI-RS. In an example, the first network entity 402 may receive, at 428, the periodic/aperiodic/semi-persistent CSI-RS for measuring the channel after reception/transmission, at 420, of the channel model configuration and initial parameters.

Based on receiving the periodic/aperiodic/semi-persistent CSI-RS from the second network entity 404, the first network entity 402 may execute, at 426, a channel tracking and channel measurement algorithm. The second network entity 404 may likewise execute, at 424, a channel tracking algorithm after transmission, at 428, of the periodic/aperiodic/semi-persistent CSI-RS to the first network entity 402. Based on a channel measurement by the first network entity 402 indicative of a change in a condition of the channel, the first network entity 402 may transmit, at 430, a model parameter update to the second network entity 404 via a CSI feedback procedure. For example, a state-space model including complex and/or vector weights, a measured noise variance, etc., may be signaled, at 430, from the first network entity 402 to the second network entity 404. Each of the nodes (e.g., UE and base station) may be configured to further track the state-space variation. In some implementations, the nodes may determine a mapping between the physical channel and a state vector, and/or a relation between PMI/RI/LI/CQI and the state vector. The mapping/relationship may be incorporated in an exchange of common model information between the nodes.

Each of the nodes may be configured to update/track the channel variation/state-space variation based on one or more filtering operations for the state-space model. For example, one of the nodes may execute an adaptive CSI update algorithm, such as a Kalman filtering algorithm, to track the channel variation, where the update may be transmitted to the other node based on a measurement performed by a measuring node. A CSI report of model parameters (e.g., at 430) may include a Kalman gain update, an indication of non-measuring node updates for the model/channel information, etc. The update, at 430, may be performed by a measuring entity (e.g., the first network entity 402) using a compressed CSI report in which the report may include the model parameter updates for the non-measuring entity (e.g., second network entity 404) to update the model information.

When a state change occurs (e.g., due to a mobility change), the first network entity 402 (e.g., UE) may sparsely update the model parameter to reduce signaling/resource overhead while also ensuring reliable and efficient tracking of the channel variation. In examples, the first network entity 402 may reset a tracking session to ensure that both network entities are tracking the channel variation based on a same state-space model. When an update occurs, at 430, based on a measurement by the first network entity 402 or when a change to the physical channel is detected, a compressed CSI report may be transmitted, at 430, to the second network entity 404 or the tracking session may be reset at the first network entity 402. Such techniques may reduce the signaling overhead and increase the throughput of the system. Accordingly, a model-based representation of the channel may provide both an overhead reduction and more efficient tracking of the channel via a decreased amount of CSI feedback and measurements by the first network entity 402.

Model-based channel compression techniques may be based on the first network entity 402 performing a channel measurement and transmitting, at 430, the compressed CSI feedback report to the second network entity 404. However, model-based channel compression may also be performed for uplink and/or sidelink communications. For instance, the first network entity 402 may indicate the channel model configuration and initial parameters in the reverse direction to the second network entity 404, which may track the channel based on the state-space model for the channel model configuration associated with the communication link between the first network entity 402 and the second network entity 404. Channel measurements by the second network entity 404 may be based on an uplink reference signal, such as SRS, such that the second network entity 404 may transmit model parameter updates in the reverse direction to the first network entity 402.

After an initial setup procedure between the first network entity 402 and the second network entity 404, a reference signal for channel measurement, such as the periodic/aperiodic/semi-persistent CSI-RS or SRS, may be communicated between the nodes. Feedback may be transmitted from the measuring node to the non-measuring node, such that both nodes may determine an initial state of the system. One node may transmit the feedback to the other node in some cases before receiving the model configuration from the other node. For example, CSI feedback may correspond to transmissions of CSI-RS and CSI feedback that are also used for non-model based tracking (e.g., which may be referred to as legacy CSI-RS transmissions/feedback), which may be used by the second network entity 404 to configure the model and the initial parameters transmitted to the first network entity 402.

Both nodes may track the channel variation based on the state-space model. If the first network entity 402 is the node that is performing the channel measurement, the first network entity 402 may provide the update, at 430, in addition to the channel tracking, at 426, to recommend a state-space change to the second network entity 404. That is, the measuring node may perform both the tracking procedure and the channel measurement for updating, at 430, the model parameters.

The first network entity 402 may indicate a delta change to the second network entity 404 via compressed CSI feedback, which may be used for updating the state-space model at the second network entity 404. Channel tracking procedures may be respectively executed at both nodes, at 424 and 426, but when a measurement and update occur at one of the nodes, the measurement and update may be indicated to the other node via a feedback procedure. Frequent CSI transmissions and reporting, signaling overhead, and power consumption may be reduced via model-based channel compression techniques. Likewise, uplink reference signals may be used to perform the procedure in the reverse direction where the second network entity 404 may update the model/states and signal the updated model/states to the first network entity 402.

In some aspects, as shown at 416, the first network entity 402 may provide initial feedback, such as initial CSI, for the channel. In some aspects, the second network entity 404 may send an indication 410 to the first network entity to start channel tracking. The second network entity 404 may transmit a reference signal 412 such as a periodic CSI-RS, a semi-persistent CSI-RS, an aperiodic CSI-RS, or another reference signal. The first network entity 402 may measure the reference signal, at 414, to obtain an initial assessment, or measurement of the channel, e.g., h(0). The first network entity 402 may transmit feedback 416 to the second network entity based on the measurement of the CSI-RS. The feedback 416 may indicate the estimation of the channel h(0). In some aspects, the second network entity 404 may indicate an ACK or a NACK, e.g., 418, for the channel, e.g., h(0), indicated by the first network entity 402. The response from the network, at 420 may include one or more model parameters, e.g., F and/or Q, in addition to an ACK/NACK 418 for h(0). For example, before the channel model configuration and initial parameters are communicated, at 406, the first network entity 402 may send feedback 416, which the second network entity 404 may use to determine the channel model configuration and/or initial parameters to send to the first network entity. Additionally, or alternatively, the first network entity 402 may send initial feedback 416 that assists the first network entity 402 and/or the second network entity 404 in tracking the channel at 424 and/or 426.

In some aspects, the first network entity 402 (e.g., UE) may detect a model change based on a local event at the first network entity 402, e.g., at 432. The local event may include a mobility change of the first network entity 402, a change in channel conditions (e.g., noise, interference, blockage), or a change of the physical device (e.g., battery life, power usage, device heating, etc.).

After the first network entity 402 detects, at 406, a change to the model/states, the first network entity 402 may trigger, at a second network entity 404 (e.g., base station), a switch of the channel or an update to the model. For example, the first network entity 402 may transmit, at 434, a request for an updated channel and/or an updated set of recommended initial parameters. In cases where the first network entity 402 performs the measurement, the first network entity 402 may switch a Tx/Rx configuration based on detected changes to the mobility of the first network entity 402, channel conditions, device conditions, etc. The switch of the Tx/Rx configuration may impact parameters of the channel model configuration.

If the first network entity 402 detects, at 432, a model change based on a local event at the first network entity 402, the first network entity 402 may indicate to the second network entity 404 that the nodes may no longer use a current channel model configuration, e.g., at 434. For example, the first network entity 402 may transmit (e.g., in a PUSCH) the request, at 434, for the updated channel and/or the updated set of recommended initial parameters. Based on a report from the first network entity 402, the second network entity 404 may respond/transmit, at 436, to the first network entity 402 with a confirmation message to the request and/or an updated channel model configuration and parameters.

As both nodes may be tracking the channel based on a common model, e.g., as shown at 426 and 424, whenever a change is detected by one of the nodes, the detecting node may indicate the change to the other node (e.g., non-detection node). In some examples, a different beam pair may be used for communications between the first network entity 402 and the second network entity 404. If a different beam is used by one of the nodes to perform the communication, the different beam may have different properties based on the channel parameters. For instance, the different beam may have a different delay spread, Doppler spread, etc. The parameters may be beam-specific. Hence, if a different tracking procedure is to be performed for the different beam or the different CSI-RS resource, or if the number of ports or the rank associated with the transmission has changed, a new tracking session may have to be initiated.

The channel model may be in a discrete time domain, with a sampling duration as an adjustable parameter. For example, the sampling duration may be one of the parameters indicated to the first network entity (e.g., such as a UE) by the second network entity (e.g., such as a base station) as part of or in connection with a model configuration.

An example state-space channel model may correspond to h(n)=Fh(n−1)+w(n), and an example observation model may correspond to z(n)=h(n)+v(n), where h(n) corresponds to the channel at time n, F corresponds to a state transition matrix, w(n) corresponds to process noise, which may be modeled as a circular symmetric complex Gaussian random variable denoted by CN(0, Q), where CN is indicative of a complex normal distribution, and v(n) corresponds to a measurement noise, which may be modeled as a circular symmetric complex Gaussian random variable denoted by CN(0, R). F, Q, and R may correspond to portions of the model configuration that are commonly known, or otherwise agreed, among the nodes. The state-space model may be indicative of the channel to be measured, whereas the state transition matrix may represent part of the model configuration between the first network entity 402 and the second network entity 404. At each observation instance, the nodes may apply the transition matrix to a previous observation to determine a current state. At least one of the nodes may measure the channel, which may include the state. The measurement process may be noisy in some cases. Thus, covariance in the system may be associated with unknown variables.

An estimate of the channel at a time n, e.g., h(n) given observations until z(n−1) may be indicated as ĥ(n|n−1), where:

$$\hat{h}(n|n-1)=F\hat{h}(n-1|n-1)$$

with a covariance matrix for time n given n−1 being $P_{n|n-1}=FP_{n-1|n-1}F^H+Q$. In some examples, rather than reporting a differential channel state (e.g., based on Δh(n)=h(n)−h(n−1)), a model-based update (e.g., based on $K_n y(n)$, where K n corresponds to a Kalman gain/filter coefficient at time n, and y(n) corresponds to a signal at time n based on the observation model and the state-space model) may be reported from the first network entity 402 to the second network entity 404. The same state-space model and Kalman filtering procedure may be used at both nodes to predict a future channel corresponding to ĥ(n+k|n). Instead of applying the state-space model to determine the channel h(n), similar state-space models may also be applied to other channel state feedback (CSF) metrics, such as CQI, PMI, etc., to determine channel information. The Kalman filtering procedure may be represented as:

$$y(n)=z(n)-\hat{h}(n|n-1)$$

$$S_n=P_{n|n-1}+R$$

$$K_n=P_{n|n-1}S_n^{-1}$$

$$\hat{h}(n|n)=\hat{h}(n|n-1)+K_n y(n)$$

$$P_{n|n}=(I-K_n)P_{n|n-1}$$

Where $S_n$ represents the covariance of y(n).

Irrespective of an observation (e.g., a CSI transmission or measurement), both network entities (for example, a UE and a base station) and UE can track h using the state transition model using ĥ(n|n−1)=Fĥ(n−1|n−1).

When an observation is available at a time instance n, the measuring entity, e.g., the first network entity 402, can provide the (Kalman) update. A sampling duration may be the same as the CSI-RS periodicity, in which case tracking may be based on measurement of the CSI-RS. In other aspects, the tracking or sampling duration may be different than the CSI-RS periodicity. When an observation is not available at an instance n, the estimate may be indicated as:

$$\hat{h}(n|n) := \hat{h}(n|n-1)$$

$$P_{n|n} := P_{n|n-1}$$

As an example, when an observation is 0, it may be treated as a missed observation. In some aspects, the time stamp of updating the model for the channel may be decoupled from the measurement of the channel, and the tracking rate and the channel measurement rate may be signaled between the network entities, e.g., between the UE and the base station. As an example, when a tracking periodicity is to be faster than a CSI-RS periodicity, then the tracking can still work by treating instances as missing observation, e.g., z(n)=0.

A beamforming technology (e.g., 5G NR mmW technology) may use beam management procedures, such as beam measurements and beam switches, to maintain a quality of a link between a first network entity and a second network entity (e.g., an access link between a base station and a UE or a sidelink communication link between a first UE and a second UE) at a sufficient level. Beam management procedures aim to support mobility and the selection of the best beam pairing (or beam pair link (BPL)) between the first network entity and the second network entity. Beam selection may be based on a number of considerations including logical state, power saving, robustness, mobility, throughput, etc. For example, wide beams may be used for initial connection and for coverage/mobility and narrow beams may be used for high throughput scenarios with low mobility.

Figure 5A:
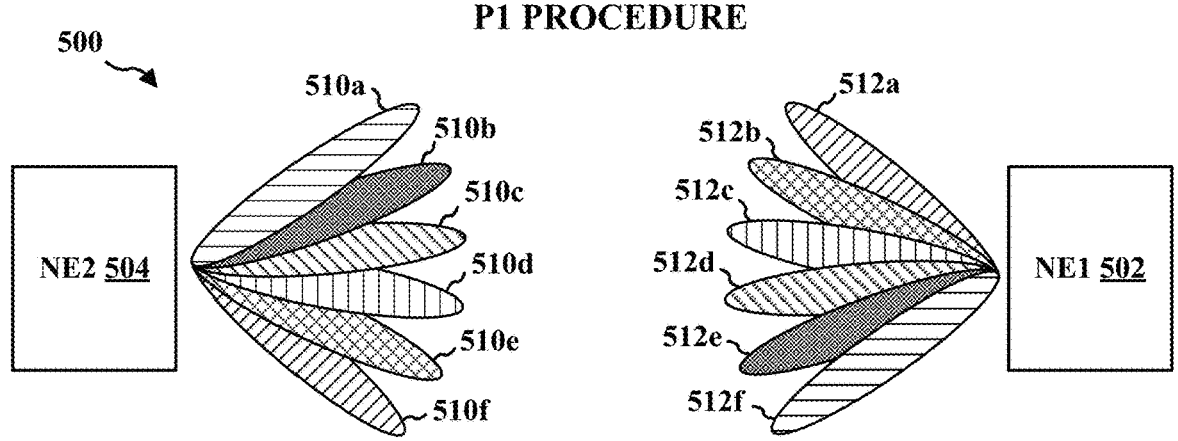
FIG. 5A illustrates an example of beam pair link (BPL) discovery and refinement, in accordance with various aspects of the present disclosure.
Figure 5B:
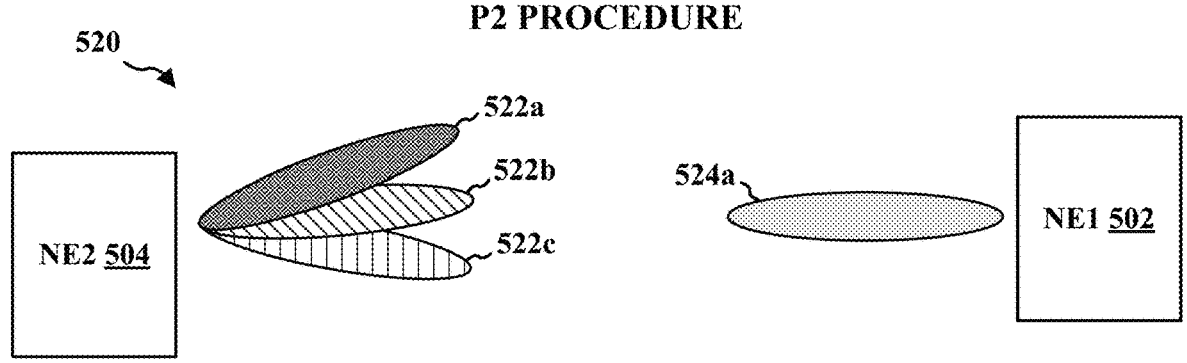
FIG. 5B illustrates another example of BPL discovery and refinement, in accordance with various aspects of the present disclosure.
Figure 5C:
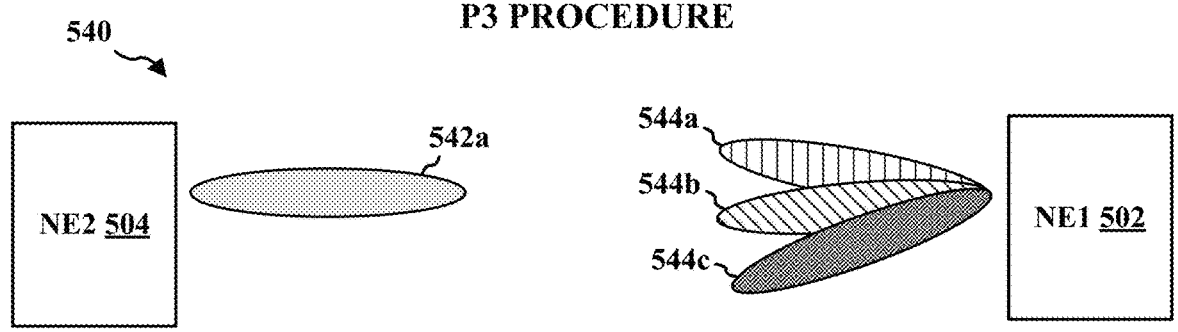
FIG. 5C illustrates another example of BPL discovery and refinement, in accordance with various aspects of the present disclosure.

FIG. 5A, FIG. 5B, and FIG. 5C illustrate an example of beam pair link (BPL) discovery and refinement for a second network entity 504 ("NE2") and a first network entity 502 ("NE1"). A beam pair link may also be referred to as a "beam pair" or a CSI-RS resource indicator (CRI). In 5G NR, P1, P2, and P3 procedures are used for beam pair discovery and refinement.

A P1 procedure enables the discovery of new BPLs. Referring to FIG. 5A, in a P1 procedure 500, the second network entity 504 transmits different symbols of a reference signal (e.g., a P1 signal), each beamformed in a different spatial direction. Stated otherwise, the second network entity 504 transmits beams using different transmit beams (e.g., transmit beams 510a, 510b, 510c, 510d, 510e, 510f) over time in different directions. For successful reception of at least a symbol of the P1 signal, the first network entity 502 searches for an appropriate receive beam. The first network entity 502 searches using available receive beams (e.g., receive beams 512a, 512b, 512c, 512d, 512e, 512f) and applying a different receive beam during each occurrence of the periodic P1 signal.

Once the first network entity 502 has succeeded in receiving a symbol of the P1 signal, the first network entity 502 has discovered a BPL. In some aspects, the first network entity 502 may not want to wait until it has found the best receive beam, since this may delay further actions. The first network entity 502 may measure a signal strength (e.g., a reference signal receive power (RSRP)) and report the symbol index together with the RSRP to the second network entity 504. Such a report may contain the findings of one or more BPLs. In an example, the first network entity 502 may determine a received signal having a high RSRP. The first network entity 502 may not know which transmit beam the second network entity 504 used to transmit. However, the first network entity 502 may report to the second network entity 504 the time at which the signal having a high RSRP was observed. The second network entity 504 may receive this report and may determine which transmit beam the second network entity 504 used at the given time.

The second network entity 504 may then offer P2 and P3 procedures to refine an individual BPL. Referring to FIG. 5B, a P2 procedure 520 refines the beam (transmit beam) of a BPL at the second network entity 504. The second network entity 504 may transmit a set of symbols of a reference signal with different beams that are spatially close to the beam of the BPL (e.g., the second network entity 504 may perform a sweep using neighboring beams around the selected beam). For example, the second network entity 504 may transmit a plurality of transmit beams (e.g., transmit beams 522a, 522b, and 522c) over a consecutive sequence of symbols, with a different beam per symbol. In the P2 procedure 520, the first network entity 502 keeps its receive beam (e.g., a receive beam 524a) constant. Thus, the first network entity 502 uses the same beam as in the BPL. The beams used by the second network entity 504 for the P2 procedure 520 may be different from those used for the P1 procedure in that they may be spaced closer together or they may be more focused. The first network entity 502 may measure the signal strength (e.g., RSRP) for the various beams (e.g., the transmit beams 522a, 522b, and 522c) and indicate the strongest beam and/or the highest RSRP to the second network entity 504. Additionally, or alternatively, the first network entity 502 may indicate all RSRPs measured for the beams. The first network entity 502 may indicate such information via a CSI-RS resource indicator feedback message, which may contain the RSRPs of the received beams (e.g., the transmit beams 522a, 522b, 522c) in a sorted manner. The second network entity 504 may switch an active beam to the strongest beam reported, thus keeping the RSRP of the BPL at a highest level and supporting low mobility. If the transmit beams used for the P2 procedure 520 are spatially close (or even partially overlapped), no beam switch notification may be sent to the first network entity 502.

Referring to FIG. 5C, a P3 procedure 540 refines the beam (receive beam) of a BPL at the first network entity 502. In this example, the second network entity 504 keeps it transmit beam (e.g., a transmit beam 542a) constant over a consecutive sequence of symbols. The first network entity 502 may use this opportunity to refine the receive beam by checking a strength of multiple receive beams (from the same or different panels). That is, while the transmit beam stays constant, the first network entity 502 may scan using different receive beams (e.g., the first network entity 502 performs a sweep using neighboring beams (e.g., receive beams 544a, 544b, and 544c)). The first network entity 502 may measure the RSRP of each receive beam and identify the best beam. Afterwards, the first network entity 502 may use the best beam for the BPL. The first network entity 502 may or may not send a report of RSRP(s) of the receive beam to the second network entity 504. By the end of the P2 and P3 procedures, the refined transmit beam at the second network entity 504 and the refined receive beam at the first network entity 502 maximize the RSRP of the BPL.

Although the examples of FIG. 5A, FIG. 5B, and FIG. 5C describe measuring and reporting RSRP, in other examples, the first network entity 502 may measure and/or report additional or alternate measurements, such as a signal to interference and noise ratio (SINR).

In the example of FIG. 4, the channel tracking is described in connection with a single Tx-Rx beam pair, which may also be referred to as a "beam pair" herein. However, as described in connection with FIG. 5A, FIG. 5B, and FIG. 5C, network entities may use beam management procedures, such as beam measurements and beam switches, to maintain a quality of a link between the respective network entities.

Aspects disclosed herein provide techniques for multiple beam tracking and beam management techniques with model-based channel tracking. For example, disclosed techniques may facilitate tracking performance of multiple beam pairs. In some examples, disclosed techniques may facilitate predicting future beam pair performance, such as predicting a beam failure.

Figure 6:
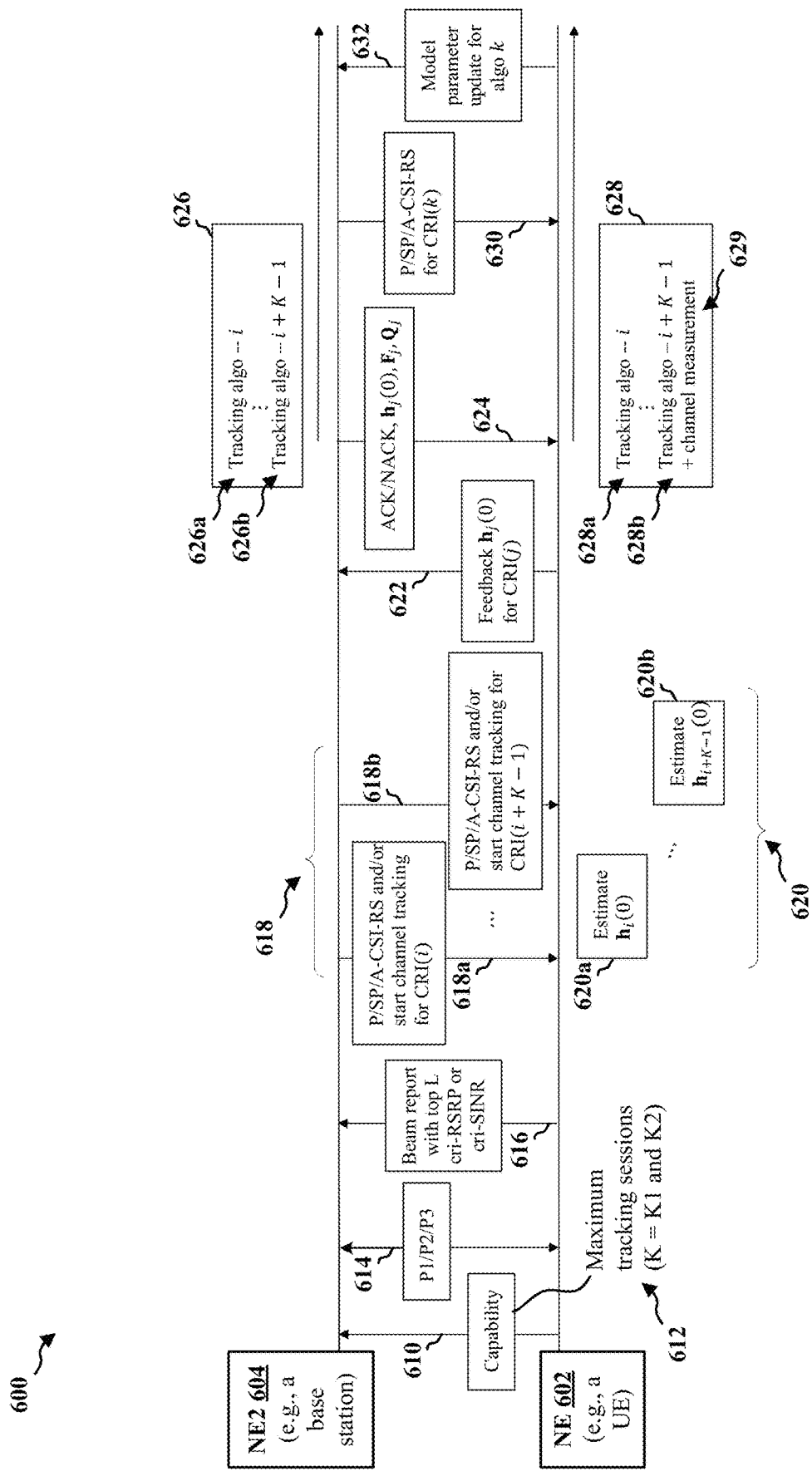
FIG. 6 is a call flow diagram illustrating communications between a first network entity and a second network entity, in accordance with various aspects of the present disclosure.

FIG. 6 illustrates an example communication flow 600 between a second network entity 604 ("NE2") and a first network entity 602 ("NE1"), as presented herein. In some aspects, the second network entity 604 may be a base station or a component of a base station (e.g., a CU, a DU, and/or an RU) and the first network entity 602 may be UE. Although not shown in the illustrated example of FIG. 6, in additional or alternate examples, the second network entity 604 and/or the first network entity 602 may be in communication with one or more other network entities, such as one or more other base stations or UEs.

In the illustrated example, the communication flow 600 facilitates tracking of multiple beam pairs based on a model-based channel representation. In some examples, the communication flow 600 may enable tracking the performance of multiple beam pairs by the second network entity 604 and/or the first network entity 602. Although the example of FIG. 6 is directed to tracking the multiple beam pairs based on downlink signaling (e.g., a CSI-RS) from the second network entity 604 to the first network entity 602, the concepts described may be applicable to tracking multiple beam pairs based on uplink signaling (e.g., a sounding reference signal (SRS)) from the first network entity 602 to the second network entity 604, or may be applicable to tracking multiple beam pairs based on downlink signaling and uplink signaling.

In the example of FIG. 6, the first network entity 602 transmits capability information 610 that is received by the second network entity 604. In some examples, the first network entity 602 may transmit the capability information 610 while performing a connection establishment procedure with the second network entity 604. The capability information 610 may include an indicator 612 indicating a maximum quantity of tracking sessions (K) that the first network entity 602 is capable of simultaneously maintaining. For example, for each beam pair that the first network entity 602 is tracking, the first network entity 602 may be configured to maintain a separate tracking session. In some examples, the indicator 612 may include a maximum quantity of downlink tracking sessions (K1) and a maximum quantity of uplink tracking sessions (K2). In some examples, the indicator 612 may include a combination of one or more of the maximum quantity of tracking sessions (K), the maximum quantity of downlink tracking sessions (K1), and the maximum quantity of uplink tracking sessions (K2).

In the example of FIG. 6, the second network entity 604 and the first network entity 602 perform beam pair procedures 614 to facilitate beam pair discovery and refinement. The beam pair procedures 614 may enable the second network entity 604 and the first network entity 602 to select one or more beam pairs. Aspects of the beam pair procedures 614 are described in connection with FIG. 5A, FIG. 5B, and FIG. 5C.

As shown in FIG. 6, the first network entity 602 may transmit a beam report 616 that is received by the second network entity 604. The beam report 616 may indicate beams pairs with the highest (or best) quality. The quality of a beam pair may be based on an RSRP measurement ("cri-RSRP") and/or an SINR measurement ("cri-SINR"). In the example of FIG. 6, the beam report 616 includes a quantity of beam pairs (L). That is, the beam report 616 includes measurement information for the top L beam pairs on which the first network entity 602 performed measurements. In some examples, the quantity of beam pairs (L) may be the same or less than the maximum quantity of training sessions (K). In other examples, the quantity of beam pairs (L) may be more than the maximum quantity of training sessions (K).

After receiving the beam report 616, the second network entity 604 may begin transmitting measurement resources 618 associated with different beam pairs. The different beam pairs may be based on the beam pairs with the highest (or best) quality. In the example of FIG. 6, the second network entity 604 selects K beam pairs for tracking. That is, the second network entity 604 selects the K beam pairs with the highest (or best) quality of the L beam pairs indicated by the beam report 616 on which to transmit the measurement resources 618. For example, the second network entity 604 may transmit a first measurement resource 618a for a first beam pair ("CRI(i)"), . . . and may transmit a second measurement resource 618b for a second beam pair ("CRI(i+k−1)"). The measurement resources 618 may include an interference measurement resource (IMR) or a channel measurement resource (CMR). The measurement resources 618 may include a periodic ("P") CSI-RS, a semi-persistent ("SP") CSI-RS, and/or an aperiodic ("A") CSI-RS.

In some examples, the transmissions associated with the measurement resources 618 may include an indication to start tracking of the respective beam pair at the first network entity 602. That is, the transmissions may include an indicator to initiate a tracking session with the first network entity 602 for each of the respective beam pairs. For example, the transmission of the first measurement resource 618a for the first beam pair (CRI(i)) may include an indication indicating to the first network entity 602 to start a tracking algorithm for the first beam pair (CRI(i)). In a similar manner, the transmission of the second measurement resource 618b for the second beam pair (CRI(i+k−1)) may include an indication indicating to the first network entity 602 to start a tracking algorithm for the second beam pair (CRI(i+k−1)).

In some examples, the transmission associated with the measurement resources 618 may include an indication for the tracking of the respective beam pair to be based on downlink signaling (e.g., a CSI-RS) or to be based on an uplink signal (e.g., an SRS). For example, of the K beam pairs that the second network entity 604 selects for tracking, the second network entity 604 may indicate a first subset of the K beam pairs to be tracked via downlink signaling and may indicate a second subset of the K beam pairs to be tracked via uplink signaling. The quantity of beam pairs of the first subset of the K beam pairs may be based on the maximum quantity of downlink tracking sessions (K1) indicated by the first network entity 602 via capability information 610. The quantity of beam pairs of the second subset of the K beam pairs may be based on the maximum quantity of uplink tracking sessions (K2) indicated by the first network entity 602 via the capability information 610.

Although not shown in the example of FIG. 6, in other examples, the second network entity 604 may transmit an indication indicating the one or more beam pairs on which the first network entity 602 is to start tracking. For example, the second network entity 604 may transmit a configuration indicating the one or more beam pairs and indication to initiate tracking for the indicated one or more beam pairs. Additionally, the second network entity 604 may transmit an indication indicating whether the tracking of each of the respective beam pairs is based on downlink signaling (e.g., the first network entity 602 is to perform channel tracking for the beam pair based on CSI-RS) or based on uplink signaling (e.g., the second network entity 604 is to perform channel tracking for the bema pair based on SRS).

As shown in FIG. 6, the first network entity 602 estimates initial channel states 620 for each of the measurement resources 618. For example, the first network entity 602 may estimate a first initial channel state 620a ($h_i(0)$) based on the first measurement resource 618a, . . . , and may estimate a second initial channel state 620b $h_{i+k-1}(0)$ based on the second measurement resource 618b. Thus, the first network entity 602 may estimate an initial channel state for each beam pair. Aspects of estimating the initial channel state are described in connection with 414 of FIG. 4.

The first network entity 602 may provide feedback 622 that is received by the second network entity 604. The feedback may be based on an estimate of an initial channel state associated with a beam pair. For example, the feedback 622 may include an initial CSI for the channel and the associated beam pair. In the example of FIG. 6, the feedback 622 indicates a j-th initial channel state ($h_j(0)$) for a j-th beam pair ("CRI(j)").

The second network entity 604 may transmit a response 624 based on the feedback 622. The response 624 may include an ACK or a NACK indicating a successful or unsuccessful, respectively, receiving of the feedback 622. In some examples, the response 624 may include the initial channel state for the channel and beam pair (e.g., the $h_j(0)$) for the j-th beam pair (CRI(j))). The second network entity 604 may include the initial channel state for the channel and beam pair (e.g., the $h_j(0)$) for the j-th beam pair (CRI(j))) so that the second network entity 604 and the first network entity 602 are using the same model configuration when tracking the respective channel and beam pair. In some examples, the response 624 may include one or more model parameters, such as the state transmission matrix $F_j$ and the process noise covariance $Q_j$ associated with the j-th beam pair and the corresponding channel. Aspects of the response 624 are described in connection with 418 and/or 420 of FIG. 4.

Based on transmitting the response 624, the second network entity 604 may execute tracking algorithms 626. As shown in FIG. 6, the second network entity 604 may execute a separate tracking algorithm for each of the beam pairs being tracked by the second network entity 604 and the first network entity 602. For example, the second network entity 604 may execute a first tracking algorithm 626a associated with the first beam pair (CRI(i)), . . . , and may execute a second tracking algorithm 626b associated with the second beam pair (CRI(i+k−1)). Aspects of the tracking algorithms 626 are described in connection with 424 and 426 of FIG. 4.

The first network entity 602 may likewise execute channel tracking algorithms 628 and channel measurement algorithms 629. As shown in FIG. 6, the first network entity 602 may execute a separate channel tracking algorithm for each of the beam pairs being tracked by the second network entity 604 and the first network entity 602. For example, the first network entity 602 may execute a first channel tracking algorithm 628a associated with the first beam pair (CRI(i)), . . . , and may execute a second channel tracking algorithm 628b associated with the second beam pair (CRI(i+k−1)). The first network entity 602 may also execute channel measurement algorithms 629 to perform measurements for the corresponding channels. Aspects of the channel tracking algorithms 628 are described in connection with 424 and 426 of FIG. 4.

The first network entity 602 may transmit a model parameter update 632 that is received by the second network entity 604. The model parameter update 632 may be based on a channel measurement by the first network entity 602 indicative of a change in a condition of the channel. The first network entity 602 may transmit the model parameter update 632 via a CSI feedback procedure. The model parameter update 632 may include a Kalman gain update. In some examples, the first network entity 602 may provide the model parameter update 632 using a compressed CSI report in which the report may include the model parameter updates for the non-measuring entity (e.g., the second network entity 604) to update the model configuration. Aspects of the model parameter update 632 are described in connection with 430 of FIG. 4.

In the example of FIG. 6, the first network entity 602 transmits the model parameter update 632 associated with a k-th channel tracking algorithm. For example, the second network entity 604 may transmit a k-th measurement resource 630 that is received by the first network entity 602. Aspects of the k-th measurement resource 630 may be similar to the measurement resources associated with the measurement resources 618. For example, the k-th measurement resource 630 may include a periodic CSI-RS, a semi-persistent CSI-RS, or an aperiodic CSI-RS. When an update occurs based on a measurement by the first network entity 602, the first network entity 602 may transmit the model parameter update 632.

Although the example of FIG. 6 describes the response 624 being associated with the j-th beam pair (CRI(j)), it may be appreciated that the second network entity 604 may transmit a response for each of the beam pairs based on their respective feedback. Thus, the second network entity 604 may provide an initial channel state for each of the beam pairs being tracked. The second network entity 604 may also provide one or more parameters (e.g., a state transmission matrix F, a process noise covariance Q, etc.) associated with each of the beam pairs being tracked. That is, each of the tracking algorithms of the tracking algorithms 626 and the channel tracking algorithms of the channel tracking algorithms 628 may be associated with their own associated state model parameters (e.g., $F_j$, $Q_j$, etc.).

In the example of FIG. 6, the second network entity 604 may provide the state model parameters to the first network entity 602 via the response 624. In other examples, the first network entity 602 may be preconfigured with the model state parameters so that the second network entity 604 and the first network entity 602 know what model to use for each measurement resource and/or reporting occasion. For example, the second network entity 604 may configure the first network entity 602 with the state model parameters before tracking is started for a beam pair.

Figure 7:
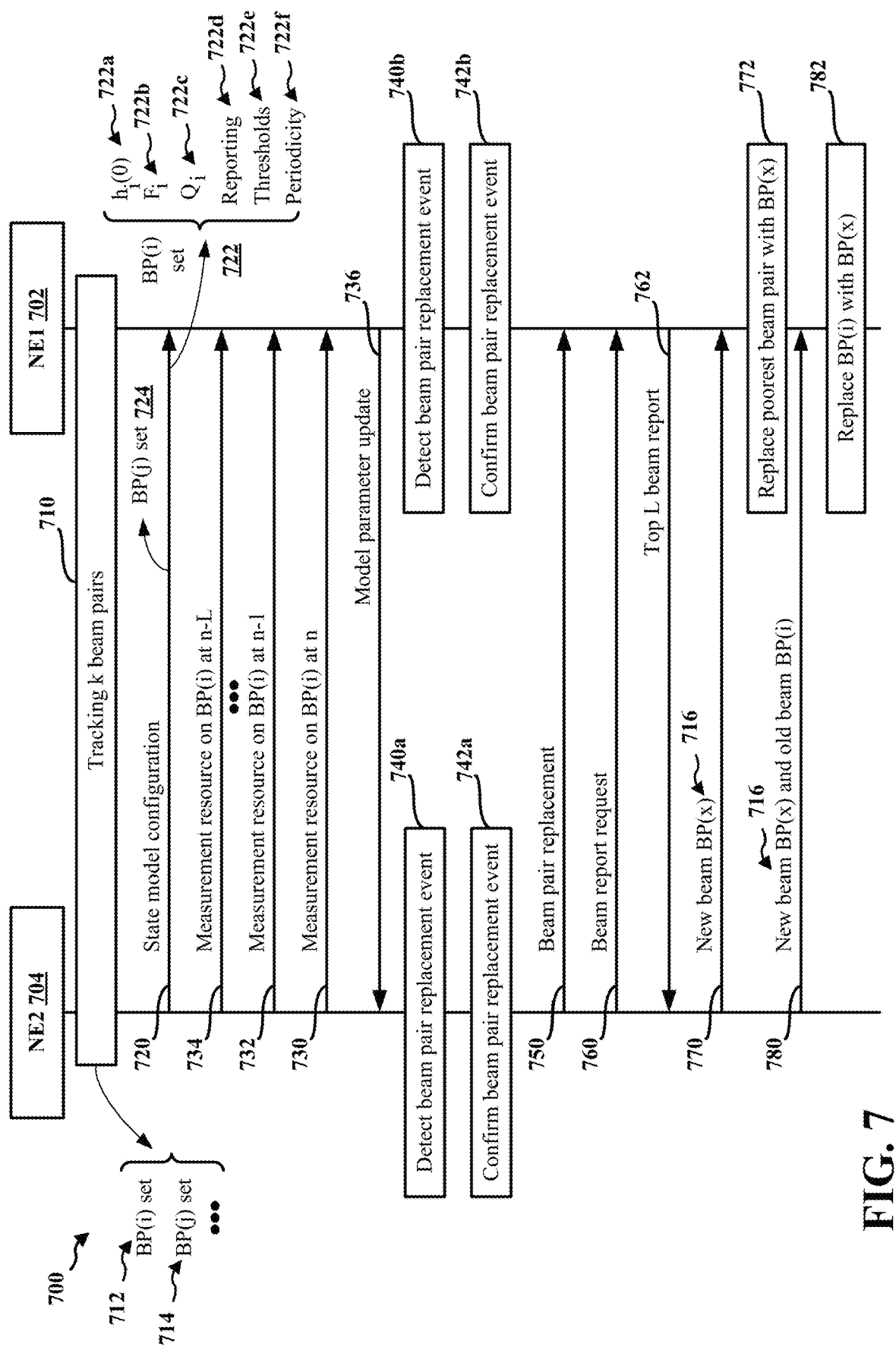
FIG. 7 is a call flow diagram illustrating communications between a first network entity and a second network entity, in accordance with various aspects of the present disclosure.

FIG. 7 illustrates an example communication flow 700 between a second network entity 704 ("NE2") and a first network entity 702 ("NE1"), as presented herein. The communication flow 700 of FIG. 7 facilitates tracking of multiple beam pairs based on a model-based channel representation and replacing a beam pair that is unusable. In some aspects, the second network entity 704 may be a base station or a component of a base station (e.g., a CU, a DU, and/or an RU) and the first network entity 702 may be UE. Although not shown in the illustrated example of FIG. 7, in additional or alternate examples, the second network entity 704 and/or the first network entity 702 may be in communication with one or more other network entities, such as one or more other base stations or UEs.

In the illustrated example of FIG. 7, the second network entity 704 and the first network entity 702 are tracking k beam pairs 710. The second network entity 704 and the first network entity 702 may be tracking the k beam pairs 710 based on a state space update model, as described in connection with the examples of FIG. 4 and FIG. 6. In the illustrated example of FIG. 7, the k beam pairs 710 includes a first beam pair 712 ("BP(i)") and a second beam pair 714 ("BP(j)"). However, other examples of k beam pairs may include any suitable quantity of beam pairs.

In some examples, tracking the k beam pairs 710 may include executing multiple tracking sessions. For example, the second network entity 704 and the first network entity 702 may execute k tracking sessions to track the k beam pairs 710. Aspects of the k tracking sessions are described in connection with the tracking algorithms 626, the channel tracking algorithms 628, and the channel measurement algorithms 629 of FIG. 6.

Each tracking session of the multiple tracking sessions may be associated with its own state model parameters. For example, a first tracking session may be associated with a first state model set including one or more state model parameters, a second tracking session may be associated with a second state model set including one or more state model parameters, etc. Examples of state model parameters for a j-th beam pair (CRI(j)) include an initial channel state ($h_j(0)$), a state transmission matrix ($F_j$), a process noise covariance ($Q_j$), as described in connection with the response 624 of FIG. 6. The state model parameters may also include a reporting configuration, a thresholds configuration, and/or a periodicity configuration. The reporting configuration may indicate what information to report when a network entity is providing channel model updates. The thresholds configuration may configure one or more thresholds used by a network entity when assessing a beam pair. The periodicity configuration may configure a rate or frequency at which a network entity is providing channel model updates.

In the illustrated example of FIG. 7, the second network entity 704 may transmit a state model configuration 720 that is received by the first network entity 702. The state model configuration 720 may provide the one or more state model parameters associated with one or more state model sets. In the example of FIG. 7, the state model configuration 720 includes a first state model set 722 and a second state model set 724. The first state model set 722 may include one or more parameters associated with a first tracking session associated with the first beam pair 712 and the second state model set 724 may include one or more parameters associated with a second tracking sessions associated with second beam pair 714. As shown in FIG. 7, the first state model set 722 includes multiple state model parameters including an initial channel state 722a ($h_j(0)$), a state transmission matrix 722b ($F_j$), a process noise covariance 722c ($Q_j$), a reporting configuration 722d, a thresholds configuration 722e, and a periodicity configuration 722f. Although not shown in the example of FIG. 7, it may be appreciated that the second state model set 724 may include one or more state model parameters associated with the second beam pair 714.

In some examples, the second network entity 704 may output the state model configuration 720 including one or more state model sets to the first network entity 702 to facilitate tracking of the k beam pairs 710. For example, the state model configuration 720 may correspond to the response 624 of FIG. 6.

In some examples, the one or more state model parameters of a state model set may be preconfigured at a network entity. For example, each beam pair of the k beam pairs 710 may be associated with a corresponding measurement resource, such as a CSI-RS resource or an SRS resource. The second network entity 704 and the first network entity 702 may exchange RRC signaling that configures the measurement resource at the respective network entities. For example, the RRC signaling may indicate time-frequency resources associated with the measurement resource. The RRC signaling may also include the one or more state model parameters associated with the measurement resource and, thus, the corresponding beam pair. For example, the first beam pair 712 may be associated with a first measurement resource. The RRC signaling associated with the first measurement resource may indicate the time-frequency resources associated with the first measurement resource and the one or more state model parameters associated with tracking the first beam pair 712 via the first measurement resource. In some examples, the RRC signaling associated with a measurement resource may include an RRC information element (IE).

In some examples, each beam pair may be associated with a respective set of one or more state model parameters. Thus, the configuration associated with two or more of the beam pairs may be different. For example, the reporting configuration 722d associated with the first beam pair 712 may be different than the corresponding reporting configuration associated with the second beam pair 714, the thresholds configuration 722e associated with the first beam pair 712 may be different than the corresponding thresholds configuration associated with the second beam pair 714, and/or the periodicity configuration 722f associated with the first beam pair 712 may be different than the corresponding periodicity configuration associated with the second beam pair 714.

In the example of FIG. 7, the second network entity 704 may transmit a measurement resource on the first beam pair 712 at different times. For example, the second network entity 704 may transmit a first measurement resource 730 on the first beam pair 712 at a time n. The first measurement resource 730 may include an IMR or a CMR. The first measurement resource 730 may include a periodic CSI-RS, a semi-persistent CSI-RS, or an aperiodic CSI-RS. Aspects of the first measurement resource 730 are described in connection with the measurement resources 618 of FIG. 6.

The first network entity 702 may receive the first measurement resource 730 and, based on a measurement of the first measurement resource 730, may transmit (e.g., output or communicate) a model parameter update 736 that is received by the second network entity 704. The model parameter update 736 may correspond to compressed delta CSI feedback, as described in connection with 430 of FIG. 4 and/or the model parameter update 632 of FIG. 6.

It may be appreciated that one or more of the beam pairs may become unusable and may be detected based on tracking of the k beam pairs 710. In some examples, a beam pair replacement event 740a may be detected by the second network entity 704. In some examples, a beam pair replacement event 740b may be detected by the first network entity 702. An occurrence of a beam pair replacement event associated with a beam pair may be referred to as an "event T." For example, a beam pair replacement event associated with the first beam pair 712 may be referred to as an event $T_i$. Likewise, the occurrence of a beam pair replacement event associated with the second beam pair 714 may be referred to as an event $T_j$.

The occurrence of an event T may be determined based on a quality metric associated with the beam pair. For example, the first network entity 702 may detect the beam pair replacement event 740*b* when the quality of a beam pair fails to satisfy a quality threshold. For example, and with respect to the first beam pair 712, the quality threshold may be configured via the thresholds configuration 722*e* of the state model configuration 720. The quality metric may include an RSRP (e.g., a layer 1 RSRP (L1-RSRP)) and/or an SINR measurement associated with the corresponding measurement resource. In some examples, the occurrence of an event T may be determined based on Equation 1 (below).

$$\|\hat{h}_i(n)\| < Q_{out,i} \qquad \text{Equation 1:}$$

In Equation 1, the term "$\hat{h}_i(n)$" refers to an estimate of the channel associated with the first beam pair 712 at a time n, and the term "$Q_{out}$" refers to a quality threshold at which a downlink radio signal cannot be reliability received. Thus, when a magnitude of the estimate of the channel is less than the $Q_{out,i}$ threshold configured for the first beam pair 712, an occurrence of an event $T_i$ may be detected.

In some examples, the occurrence of an event T may be based on a sequence of states failing to satisfy a quality threshold. For example, a network entity may detect an occurrence of an event T when M states out of a last L states fail to satisfy a quality threshold. In some examples, the occurrence of an event T may be determined based on Equation 2 (below).

$$\{\hat{h}^i(n-L), \ldots, \hat{h}_i(n-1), \hat{h}_i(n)\} < Q_{out,i} \qquad \text{Equation 2:}$$

Based on Equation 2, a network entity may perform measurements on the last L measurement resources for the first beam pair 712. For each measurement, the network entity may determine whether the measurement fails to satisfy the quality threshold (e.g., the $Q_{out}$ threshold). When a quantity M of the last L measurements fail to satisfy the quality threshold, the network entity may detect the occurrence of the event T. For example, and referring to the example of FIG. 7, the second network entity 704 may transmit the first measurement resource 730 at the time n, may transmit a second measurement resource 732 at a time n–1, and may transmit a third measurement resource 734 at a time n–L. In the example of FIG. 7, the time n–1 may occur before the time n in the time domain, and the time n–L may occur before the time n–1 in the time domain. The first network entity 702 may perform a number of quality determinations based on the received measurement resources. For example, the first network entity 702 may perform a first quality determination based on a measurement of the third measurement resource 734 and the quality threshold (e.g., the $Q_{out}$ threshold), may perform a second quality determination based on a measurement of the second measurement resource 732 and the quality threshold, and may perform a third quality determination based on a measurement of the first measurement resource 730 and the quality threshold. When a quantity M of the L quality determinations indicate unsatisfied qualities, the first network entity 702 may detect the occurrence of the beam pair replacement event 740*b*.

In some examples, the state model configuration 720 may configure the quantity M, the quantity L, and the $Q_{out}$ threshold. Additionally, the quantity M, the quantity L, and the $Q_{out}$ threshold may be different for one or more of the k beam pairs 710. For example, the thresholds configuration 722*e* may include a quantity $M_i$, a quantity $L_i$, and a $Q_{out,i}$ threshold associated with the first beam pair 712, and a corresponding thresholds configuration of the second state model set 724 may include a quantity a quantity $L_j$, and a $Q_{out,i}$ threshold associated with the second beam pair 714.

In some examples, the occurrence of an event T may be determined based on a change in quality of a channel associated with a beam pair. For example, the occurrence of an event T may be determined based on Equation 3 (below).

$$\|\hat{h}_i(n) - \hat{h}_i(n-1)\| > Q_i \qquad \text{Equation 3:}$$

Based on Equation 3, a network entity may compare the estimate of the channel state at time n (e.g., the $\hat{h}_i(n)$) to the estimate of the channel state at time n–1 (e.g., $\hat{h}_i(n-1)$) and when the magnitude of the change is greater than a quality threshold (e.g., a $Q_i$), the network entity may detect the occurrence of an event T.

In some examples, the state model configuration 720 may configure the Q threshold. Additionally, the Q threshold may be different for one or more of the k beam pairs 710. For example, the thresholds configuration 722*e* may include a $Q_i$ threshold associated with the first beam pair 712, and a corresponding thresholds configuration of the second state model set 724 may include a $Q_i$ threshold associated with the second beam pair 714.

In the examples of Equation 1, Equation 2, and Equation 3, the detecting of an occurrence of an event T is associated with the first beam pair 712 (e.g., an event $T_i$). However, the respective equations may be modified for detecting an occurrence of an event T associated with any other beam pair of the k beam pairs 710.

It may be appreciated that the detection of an event T (e.g., the beam pair replacement event 740*a* at the second network entity 704 and/or the beam pair replacement event 740*b* and the first network entity 702) may be different than a beam failure detection (BFD). For example, for BFD, a hypothetical block error rate (BLER) is used, which is a measurement known to a network entity (e.g., a UE) receiving a measurement resource (e.g., the first network entity 702). In contrast, the occurrence of an event T may be detected by a network entity receiving a measurement resource (e.g., the first network entity 702) or a network entity transmitting the measurement resource (e.g., the second network entity 704).

In some examples, the occurrence of an event T (e.g., the beam pair replacement event 740*a* and/or the beam pair replacement event 740*b*) may trigger signaling between the second network entity 704 and the first network entity 702 related to the corresponding beam pair. For example, the occurrence of the event $T_i$ may trigger the second network entity 704 and the first network entity 702 to exchange signaling related to replacing the first beam pair 712.

In the example of FIG. 7, the second network entity 704 may transmit a beam pair replacement communication 750 to signal to the first network entity 702 to replace a "poor" beam pair. As used herein, a poor beam pair refers to a beam pair for which the event T is detected. For example, after the occurrence of the event $T_i$ is detected, the second network entity 704 may transmit the beam pair replacement communication 750 to indicate to the first network entity 702 that a replacement beam pair for the first beam pair 712 is needed.

In some examples, when at least one event T is detected among the k beam pairs 710 being tracked, the second network entity 704 may request the first network entity 702 provide a beam report including a top L beam pairs. For example, the second network entity 704 may transmit a beam report request 760 that is received by the first network entity 702. The beam report request 760 may request that the first network entity 702 provide a beam report including measurement information for a top L beam pairs. As shown in FIG. 7, the first network entity 702 may transmit a beam report 762 that is received by the second network entity 704. Aspects of the beam report 762 may be similar to the beam report 616 of FIG. 6. For example, the beam report 762 may include measurement information for the top L beam pairs on which the first network entity 702 performed measurements. In such examples, the second network entity 704 and the first network entity 702 may exchange signaling to reset the tracking sessions and to start new tracking sessions for multiple beam pairs, as described in connection with the example communication flow 600 of FIG. 6.

In some examples, when an event T is detected, the second network entity 704 may signal a new beam pair 716 ("BP(x)"). For example, the second network entity 704 may transmit a communication 770 that is received by the first network entity 702. The communication 770 may include an indicator associated with the new beam pair 716. In some such examples, the first network entity 702 may, at 772, replace the poorest beam pair with the new beam pair 716. For example, the first network entity 702 may determine which of the k beam pairs 710 has the poorest beam quality and replace the determined beam with the new beam pair 716. The first network entity 702 and the second network entity 704 may then begin a tracking session associated with the new beam pair 716.

In some examples, when an event T is detected, the second network entity 704 may indicate a new beam pair to replace an old beam pair. For example, the second network entity 704 may transmit a communication 780 that is received by the first network entity 702. The communication 780 may include a first indicator indicating a new beam pair (e.g., the new beam pair 716) for which the first network entity 702 is to start a new tracking session. The communication 780 may also include a second indicator indicating an old beam pair (e.g., the first beam pair 712) that the first network entity 702 is to stop tracking. That is, based on the communication 780, the first network entity 702 may, at 782, replace the old beam pair (e.g., the first beam pair 712) with the new beam pair (e.g., the new beam pair 716). The second network entity 704 and the first network entity 702 may also start a tracking session associated with the new beam pair.

As shown in FIG. 7, the occurrence of an event T may be detected at the second network entity 704 and/or the first network entity 702. In some examples, the occurrence of an event T may be erroneously detected. For example, an occurrence of an event T may be due to a tracking algorithm error at the second network entity 704 and/or the first network entity 702. In some examples, an occurrence of an event T may be detected at the second network entity 704 or the first network entity 702 and not by both network entities. In some examples, an occurrence of an event T may be detected by a network entity, or both network entities, without a recent transmission of a measurement resource on the corresponding beam pair. In some examples, an occurrence of an event T may be detected by a network entity, or both network entities, without receiving measurement of a measurement resource on the corresponding beam pair.

In some examples, to prevent the replacement of a beam pair based on an erroneous occurrence of an event T, the second network entity 704 and/or the first network entity 702 may perform a confirmation procedure. The network entities may perform the confirmation procedure to confirm that the assessment of an occurrence of an event T is accurate. In some examples, the network entity detecting the occurrence of an event T may initiate the confirmation procedure. For example, if the second network entity 704 detects the beam pair replacement event 740a, then the second network entity 704 may initiate a confirmation procedure 742a to confirm that the detection of the beam pair replacement event 740a is accurate. In a similar manner, if the first network entity 702 detects the beam pair replacement event 740b, then the 704/may indicate a confirmation procedure 742b to confirm that the detection of the beam pair replacement event 740b is accurate. Aspects of the confirmation procedures are described in connection with FIG. 8A, FIG. 8B, and FIG. 8C.

Figure 8A:
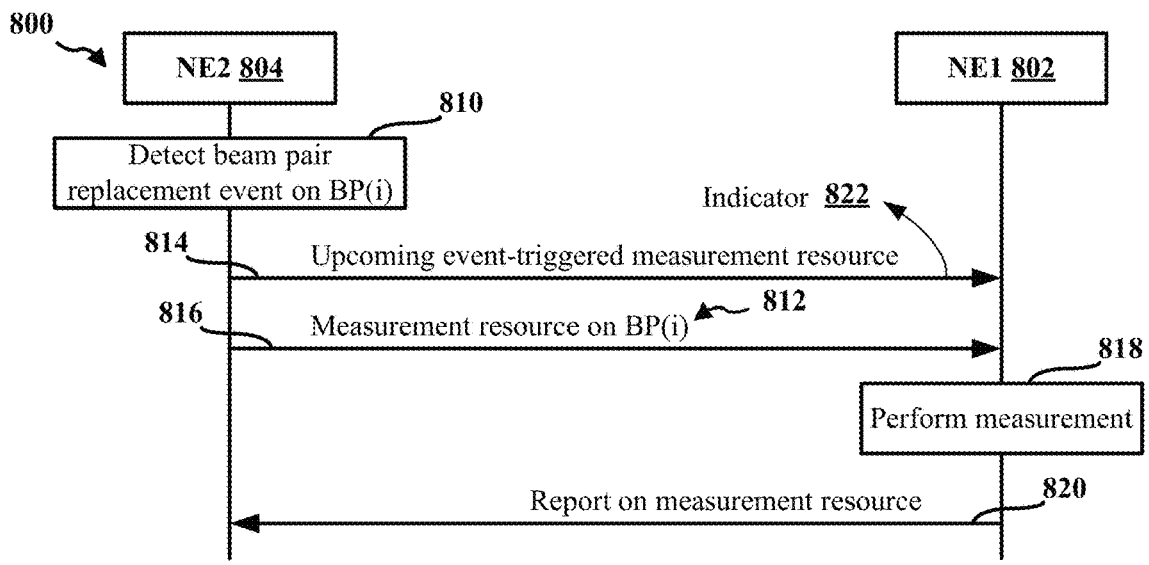
FIG. 8A, FIG. 8B, and FIG. 8C are call flow diagrams illustrating communications between a first network entity and a second network entity, in accordance with various aspects of the present disclosure.
Figure 8B:
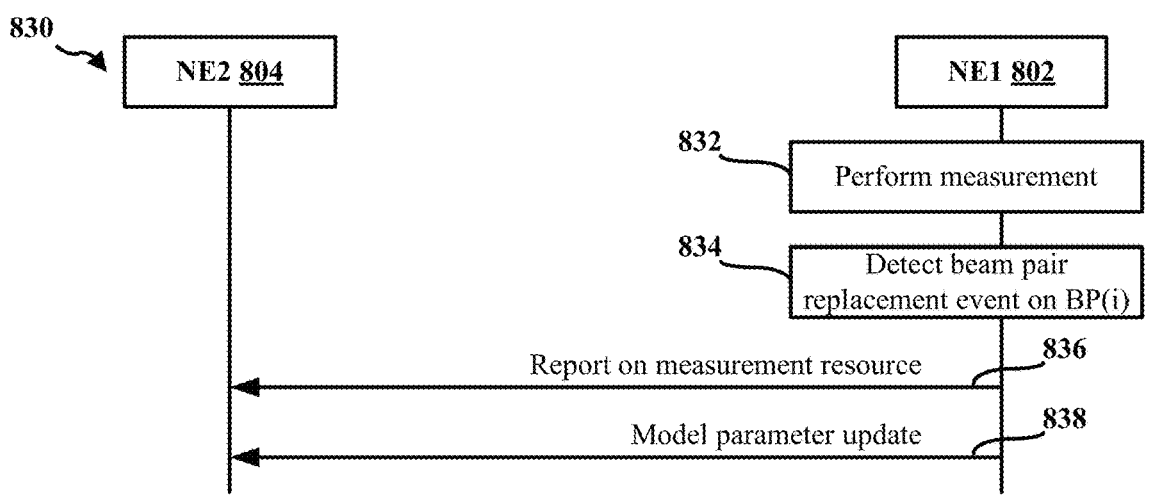
Figure 8C:
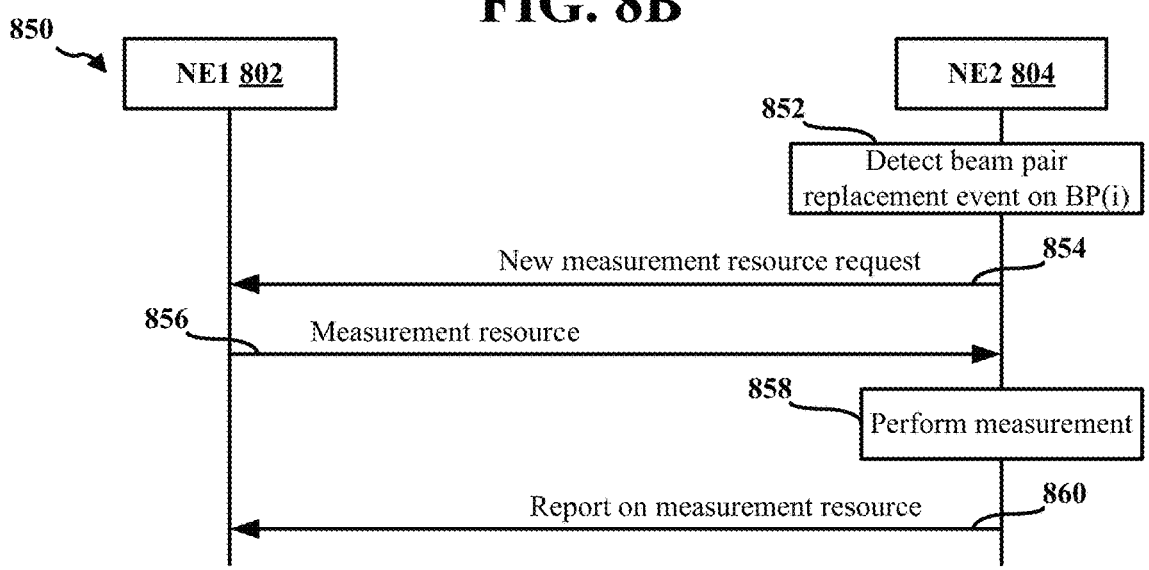

FIG. 8A, FIG. 8B, and FIG. 8C illustrate example communication flows to perform respective confirmation procedures between a second network entity 804 ("NE2") and a first network entity 802 ("NE1"), as presented herein. In the illustrated examples, the second network entity 804 may be a network entity transmitting a measurement resource and the first network entity 802 may be a network entity receiving the measurement resource. For example, the second network entity 804 may correspond to the second network entity 604 of FIG. 6 and/or the second network entity 704 of FIG. 7, and the first network entity 802 may correspond to the first network entity 602 of FIG. 6 and/or the first network entity 702 of FIG. 7.

The example communication flows of FIG. 8A, FIG. 8B, and FIG. 8C may enable a detecting network entity (e.g., a network entity that detects the occurrence of an event T) to verify that the detection of the event T is accurate and, thus, to avoid replacing a beam pair that may have a satisfactory quality. In the illustrated examples, the event T may be detected on a first beam pair 812 ("BP(i)").

FIG. 8A illustrates an example communication flow 800 in which the second network entity 804 detects the occurrence of an event T (e.g., the beam pair replacement event 740a of FIG. 7). For example, the second network entity 804 may detect a beam pair replacement event 810. Aspects of detecting the beam pair replacement event 810 are described in connection with the beam pair replacement event 740a of FIG. 7.

After detecting the beam pair replacement event 810, the second network entity 804 may transmit a measurement resource 816 using the first beam pair 812. The measurement resource 816 may be an event-triggered measurement resource. That is, the transmission of the measurement resource 816 is based on the occurrence of the beam pair replacement event 810. The second network entity 804 may use the first beam pair 812 to transmit the measurement resource 816 so that a new measurement for the first beam pair 812 may be reported. For example, the first network entity 802 may perform a measurement 818 on the measurement resource 816. The measurement 818 may include an RSRP (e.g., an L1-RSRP) and/or an SINR. The first network entity 802 may also transmit a report 820 that is received by the second network entity 804. The report 820 may include the measurement 818 on the measurement resource 816. The second network entity 804 may then verify that the first beam pair 812 is unusable beam pair based on the report 820 from the first network entity 802. If the second network entity 804 determines that the first beam pair 812 is a poor beam pair (e.g., based on the report 820), the second network entity 804 may signal beam pair replacement, as described in connection with the beam pair replacement communication 750 of FIG. 7.

In the example of FIG. 8A, the transmitting of the measurement resource 816 and report 820 are different from beam management procedures in that the second network entity 804 and the first network entity 802 are already communicating via the first beam pair 812. Additionally, the first network entity 802 is transmitting compressed CSI reports (e.g., model parameter updates) to the second network entity 804 for the first beam pair 812 during the tracking session associated with the first beam pair 812, as described in connection with the channel tracking algorithms 628 of FIG. 6.

However, to verify the assertion that the first beam pair 812 is an unusable beam pair (e.g., a poor quality beam pair), the second network entity 804 may request that the first network entity 802 include a measurement quantity with the report 820. For example, the second network entity 804 may transmit a communication 814 signaling an upcoming event-triggered measurement resource. The communication 814 may configure the first network entity 802 to receive the measurement resource 816. For example, the communication 814 may indicate time resources and/or frequency resources that the first network entity 802 may use to locate the measurement resource 816. In the example of FIG. 8A, the communication 814 includes an indicator 822 that indicates to the first network entity 802 to include the measurement quantity (e.g., the measurement 818) with the report 820. The second network entity 804 may transmit the communication 814 and the indicator 822 via control signaling, such as DCI and/or a MAC-CE.

In some examples, the first network entity 802 may detect the occurrence of the event T. For example, FIG. 8B illustrates an example communication flow 830 in which the first network entity 802 detects the occurrence of an event T (e.g., the beam pair replacement event 740*b* of FIG. 7). For example, the first network entity 802 may detect a beam pair replacement event 834. Aspects of detecting the beam pair replacement event 834 are described in connection with the beam pair replacement event 740*b* of FIG. 7.

In the example of FIG. 8B, the first network entity 802 detects the beam pair replacement event 834 after performing a measurement 832 on a beam pair (e.g., the first beam pair 812). For example, the first network entity 802 may determine that the measurement 832 on the first beam pair 812 fails to satisfy a quality threshold or a change in quality of the first beam pair 812 fails to satisfy a quality threshold.

After detecting the beam pair replacement event 834, the first network entity 802 may transmit a report 836 that is received by the second network entity 804. Aspects of the report 836 may be similar to the report 820 of FIG. 8A. For example, the report 836 may include a measurement quantity (e.g., an L1-RSRP and/or an SINR) of a measurement resource on which the assertion of the beam pair replacement event 834 is based. The report 836 and the measurement quantity may enable the second network entity 804 to verify that the quality of the first beam pair 812 fails to satisfy a threshold quality. In some such examples, the second network entity 804 may signal beam pair replacement, as described in connection with the beam pair replacement communication 750 of FIG. 7.

As shown in FIG. 8B, the first network entity 802 may also transmit a model parameter update 838 that is received by the second network entity 804. The model parameter update 838 may include a compressed CSI report that the first network entity 802 is expected to transmit when performing a tracking session associated with the first beam pair 812.

In some examples, the first network entity 802 may detect the occurrence of the event T without performing a measurement on the first beam pair 812. For example, FIG. 8C illustrates an example communication flow 850 in which the first network entity 802 detects the occurrence of an event T (e.g., the beam pair replacement event 740*b* of FIG. 7). For example, the first network entity 802 may detect a beam pair replacement event 852. Aspects of detecting the beam pair replacement event 852 are described in connection with the beam pair replacement event 740*b* of FIG. 7.

In the example of FIG. 8C, the first network entity 802 detects the beam pair replacement event 852 without a measurement. For example, the detecting of the beam pair replacement event 852 may be due to an error in the tracking algorithm associated with the first beam pair 812. Additionally, or alternatively, the detection of the beam pair replacement event 852 may be due to the tracking rate being different from the measurement rate, among other examples of beam pair replacement events.

After the first network entity 802 detects the beam pair replacement event 852, the first network entity 802 may request that the second network entity 804 transmit a measurement resource on the first beam pair 812 so that the first network entity 802 may obtain a measurement 858 for the first beam pair 812 that is "fresh" or new. For example, the first network entity 802 may transmit a request 854 that is received by the second network entity 804. The request 854 may request the second network entity 804 to output a transmission of a measurement resource 856 on the first beam pair 812. As shown in FIG. 8C, the second network entity 804 may output the measurement resource 856 that is received by the first network entity 802. The first network entity 802 may then perform a measurement on the measurement resource 856 to obtain the measurement 858. The first network entity 802 may also transmit a report 860 that is received by the second network entity 804. Aspects of the report 860 may be similar to the report 820 of FIG. 8A. For example, the report 860 may include a measurement quantity (e.g., an L1-RSRP and/or an SINR) of the measurement resource 856 for the first beam pair 812. The report 860 and the measurement 858 may enable the second network entity 804 to verify that the quality of the first beam pair 812 fails to satisfy a threshold quality. In some such examples, the second network entity 804 may signal beam pair replacement, as described in connection with the beam pair replacement communication 750 of FIG. 7.

Figure 9:
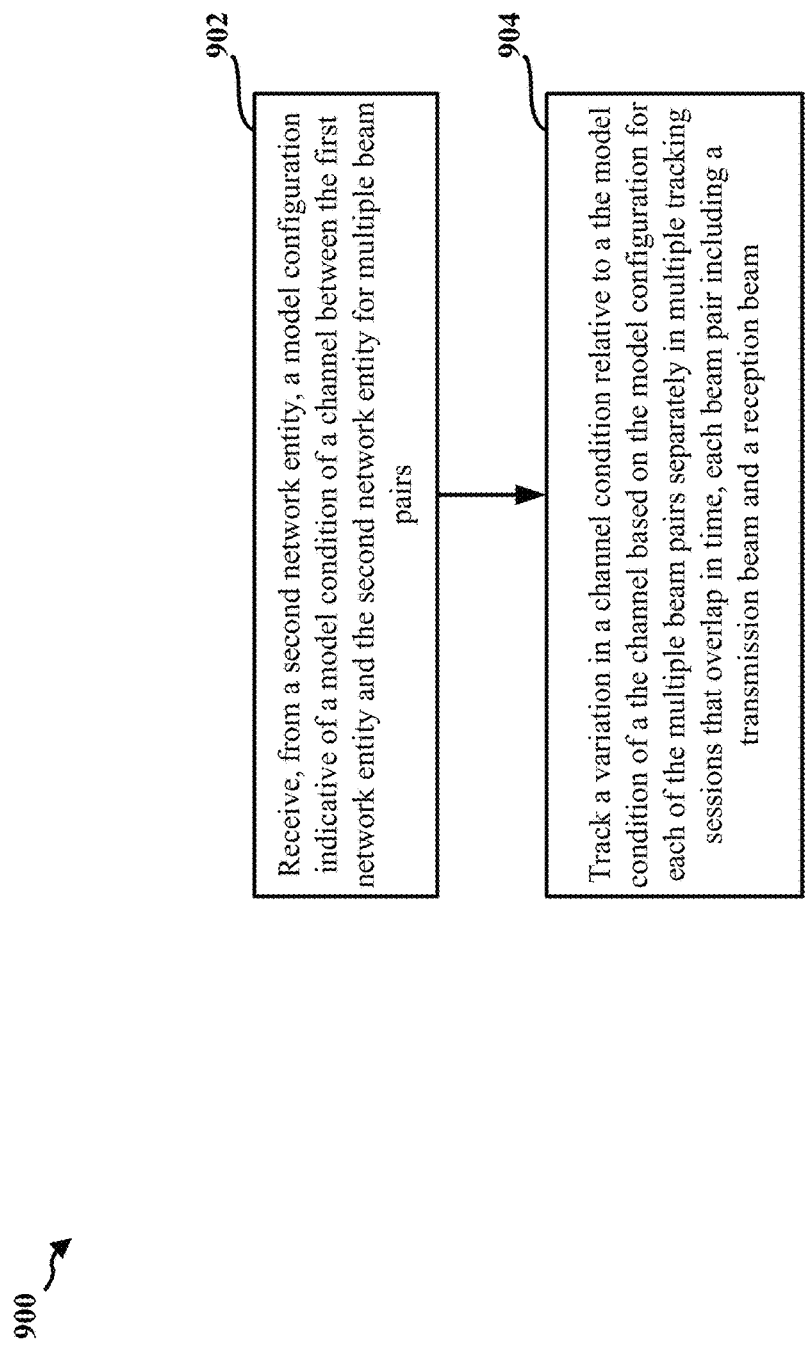
FIG. 9 is a flowchart of a method of wireless communication at a first network entity, in accordance with the teachings disclosed herein.

FIG. 9 is a flowchart 900 of a method of wireless communication. The method may be performed by a first network entity (e.g., the UE 104; the first network entity 402, 502, 602, 702, 802; and/or an apparatus 1004 of FIG. 10). In some aspects, the first network entity may be a UE and the method of the flowchart 900 may be performed by a cellular RF transceiver 1022 and/or the UE channel tracking component 198 of the apparatus 1004 of FIG. 10. In some aspects, the first network entity may be a UE, and the second network entity may be a network node, such as a base station or a device or component implementing base station functionality. In some aspects, the first network entity may be a first UE, and the second network entity may be a second UE. In some aspects, the first network entity may be a first network node, and the second network entity may be a second network node. The method may facilitate improving channel tracking and reducing signaling overhead for beam management associated with multiple beam pairs.

At 902, the first network entity receives, from a second network entity, a model configuration indicative of a model condition of a channel between the first network entity and the second network entity for multiple beam pairs, as described in connection with the channel model configuration 420 of FIG. 4 and/or the response 624 of FIG. 6. For example, the first network entity may receive one or more model configurations for the multiple beam pairs, such as receiving a model configuration for each of the beam pairs. The receiving of the model configuration indicative of the model condition may be performed by the cellular RF transceiver 1022 and/or the UE channel tracking component 198 of FIG. 10.

At 904, the first network entity tracks a variation in a channel condition relative to a model condition of a channel based on the model configuration for each of multiple beam pairs separately in multiple tracking sessions that overlap in time, each beam pair including a transmission beam and a reception beam, as described in connection with the channel tracking algorithms 628 of FIG. 6. The tracking of the variations in the channel conditions for each of the multiple beam pairs may be performed by the UE channel tracking component 198 of FIG. 10.

In some examples, the first network entity may transmit, to the second network entity, one or more updated parameters for the model configuration for one of the multiple beam pairs based on the variation of the channel condition in a corresponding tracking session of the multiple tracking sessions, as described in connection with the model parameter update 632 of FIG. 6 and/or the model parameter update 736 of FIG. 7.

In some examples, the first network entity may transmit an indication of support for a maximum number of simultaneous tracking sessions, as described in connection with the indicator 612 of FIG. 6. The first network entity may also receive a configuration to perform a number of the multiple tracking sessions that is within the maximum number of simultaneous tracking sessions supported by the first network entity, as described in connection with the state model configuration 720, the first state model set 722, and the second state model set 724 of FIG. 7.

In some examples, tracking the variation in the channel condition relative to the model configuration separately for each of the multiple beam pairs (e.g., at 904) may include tracking, in a first tracking session, a first variation in the channel condition relative to the model configuration for a first beam pair, as described in connection with the first channel tracking algorithm 628*a* of FIG. 6. Tracking the variation in the channel condition relative to the model configuration separately for each of the multiple beam pairs (e.g., at 904) may also include tracking, in a second tracking session, a second variation in the channel condition relative to the model configuration for a second beam pair, as described in connection with the second channel tracking algorithm 628*b* of FIG. 6.

In some examples, the first tracking session may be based on a first state model set and the second tracking session may be based on a second state model set, the first state model set and the second state model set each including one or more state model parameters, as described in connection with the first state model set 722 and the second state model set 724 of FIG. 7.

In some examples, the first network entity may receive a configuration of the first state model set for the first tracking session and the second state model set for the second tracking session, as described in connection with the state model configuration 720, the first state model set 722, and the second state model set 724 of FIG. 7. In some examples, the first state model set and the second state model set may be known to the first network entity (e.g., the first state model set and the second state model set may be preconfigured at the first network entity).

In some examples, the first network entity may receive, for different tracking sessions in the multiple tracking sessions, one or more of: a different report configuration, a different threshold, or a different tracking rate for determining the variation in the channel condition relative to the model configuration, as described in connection with the reporting configuration 722*d*, the thresholds configuration 722*e*, and/or the periodicity configuration 722*f* associated with the first state model set 722 and the corresponding reporting configuration, the threshold configuration, and/or the periodicity configuration associated with the second state model set 724.

In some examples, the first network entity may determine that a beam pair of the multiple beam pairs has an occurrence of an event in which the channel condition for the beam pair is below a threshold for one or more instances, as described in connection with the beam pair replacement event 740*b* of FIG. 7.

In some examples, after the determination of the occurrence of the event, the first network entity may receive a request from the second network entity for a set of beam reports based on at least a subset of the multiple beam pairs in response to the event at the beam pair, as described in connection with the beam report request 760 of FIG. 7.

In some examples, after the determination of the occurrence of the event, the first network entity may receive an indication of a new beam pair, the indication of the new beam pair indicating a replacement of the beam pair having a lowest beam quality metric, as described in connection with communication 770 and the new beam pair 716 of FIG. 7. The first network entity may also track the variation in the channel condition relative to the model configuration for the new beam pair, as described in connection with 772 of FIG. 7.

In some examples, after the determination of the occurrence of the event, the first network entity may receive a first indication of a new beam pair and a second indication of a first beam pair of the multiple beam pairs being replaced by the new beam pair, as described in connection with the communication 780 including a first indicator indicating a new beam pair (e.g., the new beam pair 716) for which the first network entity is to start a new tracking session, and a second indicator indicating an old beam pair (e.g., the first beam pair 712) that the first network entity is to stop tracking. The first network entity may also start tracking the variation in the channel condition relative to the model configuration for the new beam pair, as described in connection with 782 of FIG. 7.

In some examples, the first network entity may receive a request for a measurement report for the beam pair for which the event is detected to have occurred, as described in connection with the indicator 822 of FIG. 8A. The first network may also transmit the measurement report in response to the request, as described in connection with the report 820 of FIG. 8A. The measurement report may include at least one of an L1-RSRP or an SINR.

In some examples, the first network entity may transmit, in response to the occurrence of the event, a measurement report for at least the beam pair in addition to an indication of the variation for the channel condition relative to the model configuration, as described in connection with the report 836 and the model parameter update 838 of FIG. 8B.

In some examples, the first network entity may transmit, in response to the occurrence of the event, a request for a transmission on the beam pair, as described in connection with the request 854 of FIG. 8C.

Figure 10:
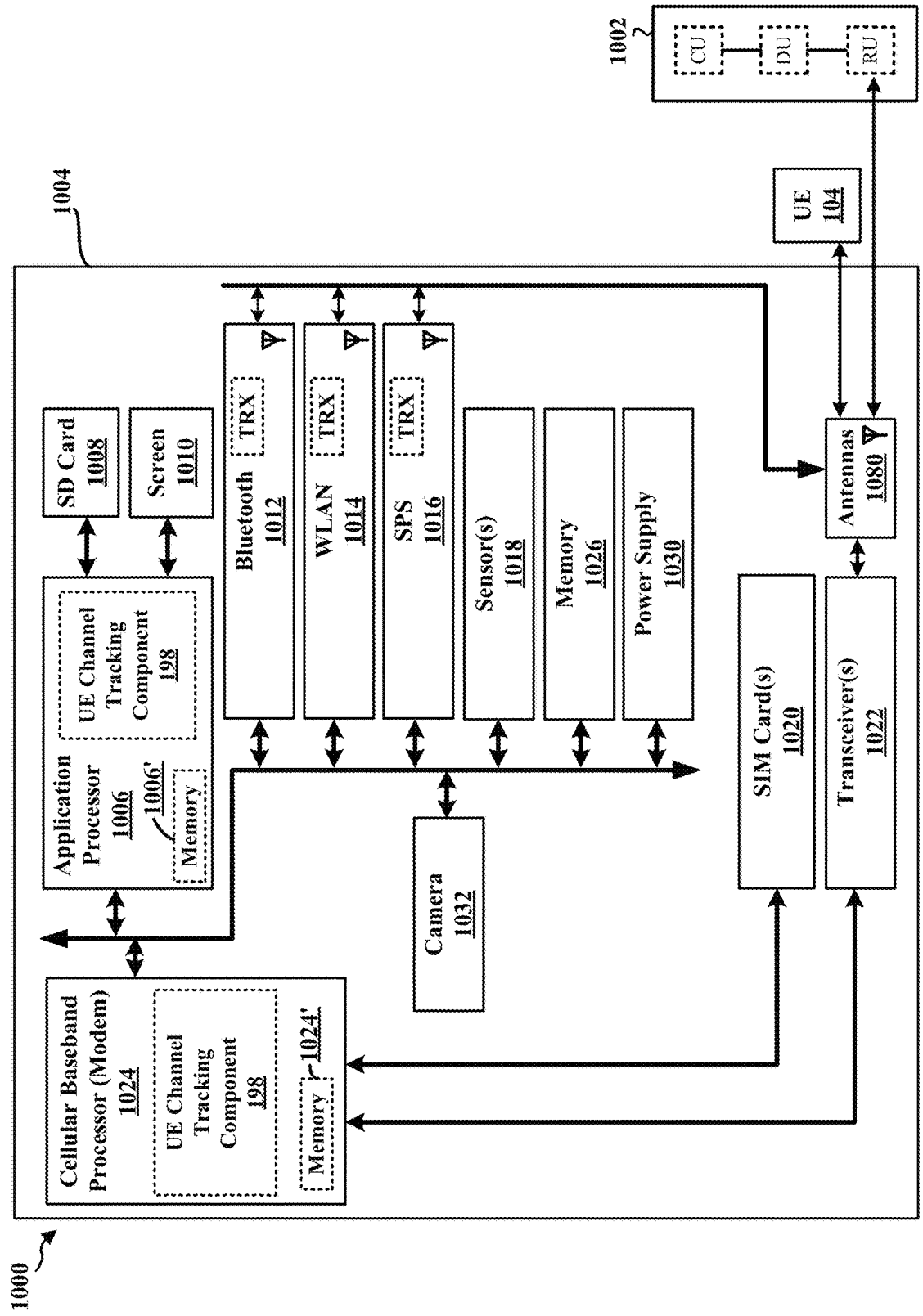
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers (e.g., a cellular RF transceiver 1022). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize one or more antennas 1080 for communication. The cellular baseband processor 1024 communicates through transceiver(s) (e.g., the cellular RF transceiver 1022) via one or more antennas 1080 with the UE 104 and/or with an RU associated with a network entity 1002. The cellular baseband processor 1024 and the application processor 1006 may each include a computer-readable medium/memory, such as the on-chip memory 1024', and the on-chip memory 1006', respectively. The additional memory modules 1026 may also be considered a computer-readable medium/memory. Each computer-readable medium/memory (e.g., the on-chip memory 1024', the on-chip memory 1006', and/or the additional memory modules 1026) may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see the UE 350 of FIG. 3) and include the additional modules of the apparatus 1004.

As discussed supra, the UE channel tracking component 198 is configured to receive, from a second network entity, a model configuration indicative of a model condition of a channel between the first network entity and the second network entity; and track a variation in a channel condition relative to the model condition of the channel based on the model configuration for each of multiple beam pairs separately in multiple tracking sessions that overlap in time, each beam pair including a transmission beam and a reception beam.

The UE channel tracking component 198 may be within the cellular baseband processor 1024, the application processor 1006, or both the cellular baseband processor 1024 and the application processor 1006. The UE channel tracking component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1004 may include a variety of components configured for various functions. For example, the UE channel tracking component 198 may include one or more hardware components that perform each of the blocks of the algorithm in the flowchart of FIG. 9 and/or any of the aspects performed by the first network entity in any of FIGS. 4-8.

In one configuration, the apparatus 1004, and in particular the cellular baseband processor 1024 and/or the application processor 1006, includes means for performing any of the aspects of the method of FIG. 9 and/or any of the aspects performed by the first network entity in any of FIGS. 4-8. The means may be the UE channel tracking component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
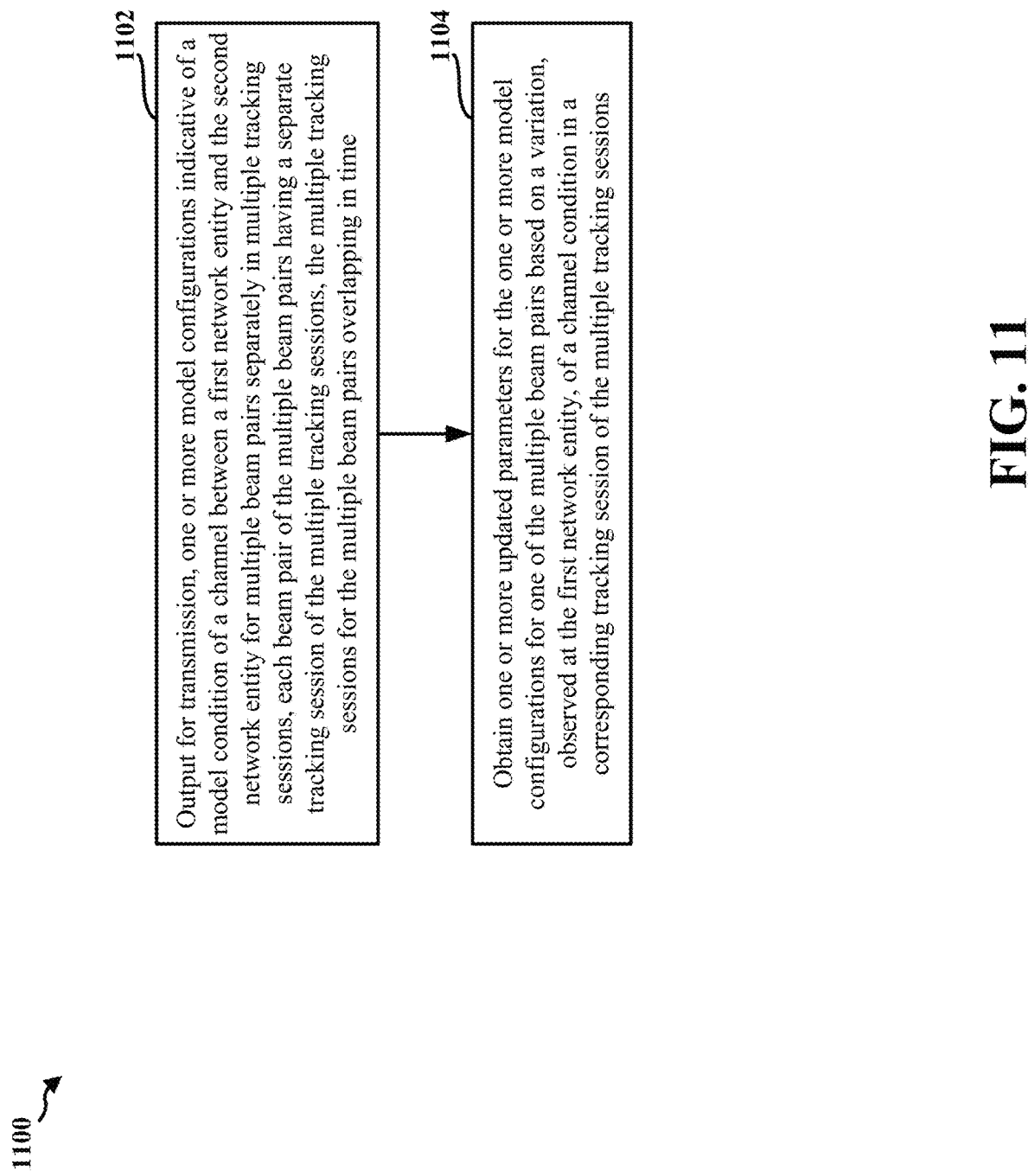
FIG. 11 is a flowchart of a method of wireless communication at a second network entity, in accordance with the teachings disclosed herein.

FIG. 11 is a flowchart 1100 of a method of wireless communication. The method may be performed by a second network entity (e.g., the base station 102; the second network entity 404, 504, 604, 704, or 804; and/or a network entity 1202 of FIG. 12). In some aspects, the first network entity may be a UE, and the second network entity may be a network node, such as a base station or a device or component implementing base station functionality. In some aspects, the first network entity may be a first UE, and the second network entity may be a second UE. In some aspects, the first network entity may be a first network node, and the second network entity may be a second network node. The method may facilitate improving channel tracking and reducing signaling overhead for beam management associated with multiple beam pairs.

At 1102, the second network entity outputs for transmission, one or more model configurations indicative of a model condition of a channel between a first network entity and the second network entity for multiple beam pairs separately in multiple tracking sessions, as described in connection with the state model configuration 720 of FIG. 7. As an example, the second network entity may transmit to the first network entity one or more model configurations indicative of a model condition of a channel between a first network entity and the second network entity for multiple beam pairs separately in multiple tracking sessions. In some examples, each beam pair of the multiple beam pairs may have a separate tracking session of the multiple tracking sessions, as described in connection with the tracking algorithms 626 of FIG. 6. In some examples, the multiple tracking sessions for the multiple beam pairs may be overlapping in time. The outputting for transmission of the model configuration may be performed by the BS channel tracking component 199 of FIG. 12.

At 1104, the second network entity obtains one or more updated parameters for the one or more model configuration for one of the multiple beam pairs based on a variation, observed at the first network entity, of a channel condition in a corresponding tracking session of the multiple tracking sessions, as described in connection with the model parameter update 632 of FIG. 6 and/or the model parameter update 736 of FIG. 7. For example, the second network entity may receive, e.g., from the first network entity, one or more updated parameters for the one or more model configuration for one of the multiple beam pairs based on a variation, observed at the first network entity, of a channel condition in a corresponding tracking session of the multiple tracking sessions. The obtaining of the one or more updated parameters for the model configuration(s) may be performed by the BS channel tracking component 199 of FIG. 12.

In some examples, the second network entity may obtain an indication of support of the first network entity for a maximum number of simultaneous tracking sessions, as described in connection with the indicator 612 of FIG. 6. The second network entity may also output for transmission a configuration to perform a number of the multiple tracking sessions that is within the maximum number of simultaneous tracking sessions supported by the first network entity, as described in connection with the k beam pairs and the state model configuration 720 of FIG. 7.

In some examples, a first tracking session for a first beam pair of the multiple beam pairs may be based on a first state model set and a second tracking session for a second beam pair of the multiple beam pairs may be based on a second state model set, the first state model set and the second state model set each including one or more state model parameters, as described in connection with the first tracking algorithm 626a and the second tracking algorithm 626b of FIG. 6. The second network entity may also output for transmission a configuration of the first state model set for the first tracking session and the second state model set for the second tracking session, as described in connection with the first state model set 722 and the second state model set 724 of FIG. 7.

In some examples, the second network entity may output for transmission, for different tracking sessions in the multiple tracking sessions, one or more of: a different report configuration, a different threshold, or a different tracking rate for determining the variation in the channel condition relative to the one or more model configurations, as described in connection with the reporting configuration 722d, the thresholds configuration 722e, and/or the periodicity configuration 722f associated with the first state model set 722 and the corresponding reporting configuration, the threshold configuration, and/or the periodicity configuration associated with the second state model set 724.

In some examples, the second network entity may output for transmission, in response to an occurrence of an event in which the channel condition for at least one beam pair of the multiple beam pairs is below a threshold for one or more instances, a request from the second network entity for a set of beam reports based on at least a subset of the multiple beam pairs in response to the event at the at least one beam pair, as described in connection with the beam report request 760 of FIG. 7.

In some examples, the second network entity may output for transmission, in response to an occurrence of an event in which the channel condition for at least one beam pair of the multiple beam pairs is below a threshold for one or more instances, an indication of a new beam pair, the indication of the new beam pair indicating a replacement of a beam pair having a lowest beam quality metric, as described in connection with the communication 770 and the indication of the new beam pair 716 of FIG. 7.

In some examples, the second network entity may output for transmission, in response to an occurrence of an event in which the channel condition for at least one beam pair of the multiple beam pairs is below a threshold for one or more instances, a first indication of a new beam pair and a second indication of a first beam pair of the multiple beam pairs, the new beam pair being a replacement for the first beam pair, as described in connection with the communication 780 including a first indicator indicating a new beam pair (e.g., the new beam pair 716) for which the first network entity is to start a new tracking session, and a second indicator indicating an old beam pair (e.g., the first beam pair 712) that the first network entity is to stop tracking.

In some examples, the second network entity may output for transmission, in response to an occurrence of an event in which the channel condition for at least one beam pair of the multiple beam pairs is below a threshold for one or more instances, a request for a measurement report for the at least one beam pair for which the event is detected to have occurred, as described in connection with the indicator 822 of FIG. 8A. The second network entity may also obtain the measurement report in response to the request, as described in connection with the report 820 of FIG. 8A. The measurement report may include at least one of an L1-RSRP or an SINR.

In some examples, the second network entity may obtain, in response to an occurrence of an event in which the channel condition for at least one beam pair of the multiple beam pairs is below a threshold for one or more instances, a measurement report for the at least one beam pair in addition to an indication of the variation for the channel condition relative to the one or more model configurations, as described in connection with the report 836 and the model parameter update 838 of FIG. 8B.

In some examples, the second network entity may obtain, in response to an occurrence of an event in which the channel condition for a beam pair of the multiple beam pairs is below a threshold for one or more instances, a request for a transmission on the beam pair, as described in connection with the request 854 of FIG. 8C.

Figure 12:
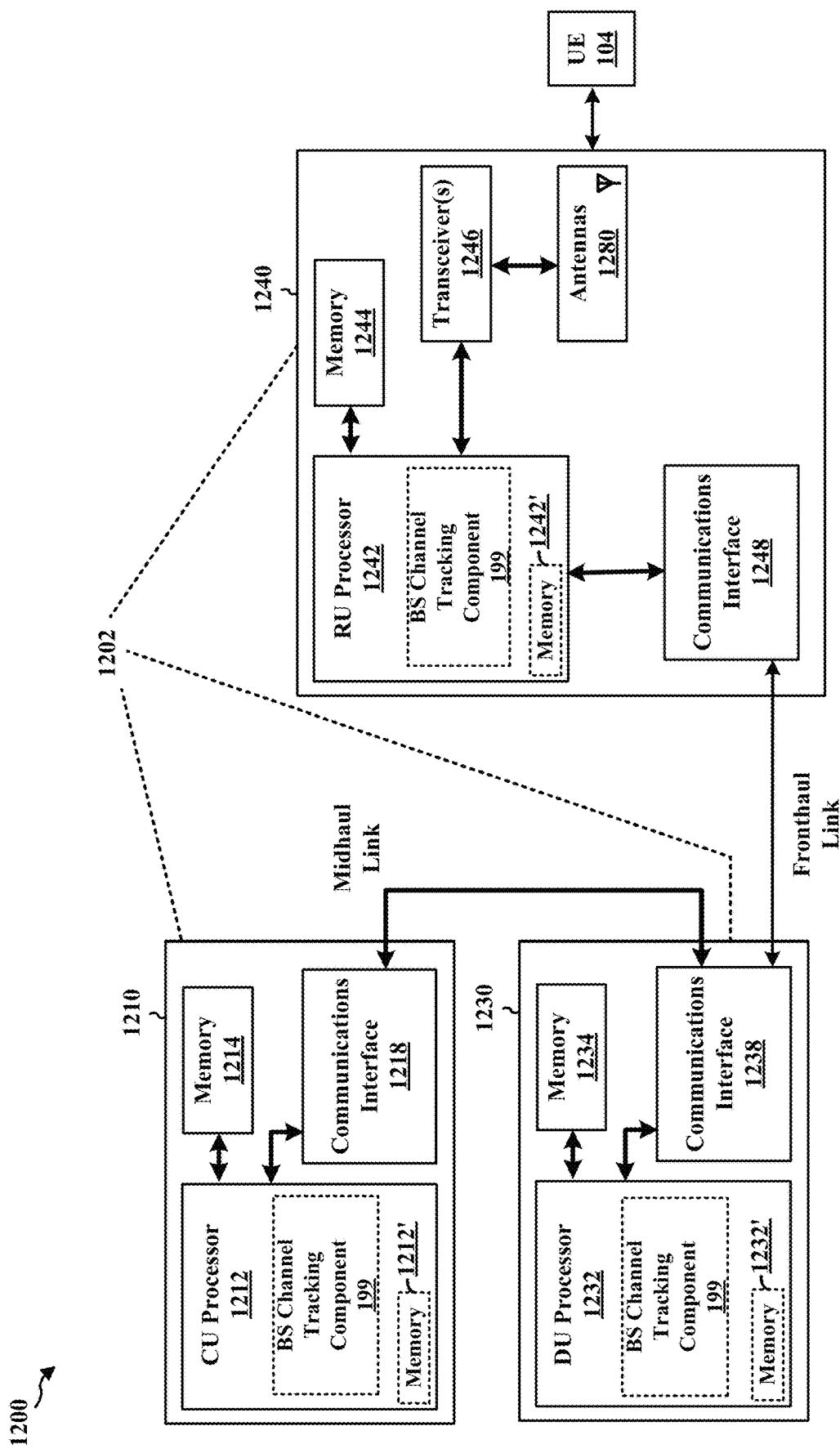
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the BS channel tracking component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memories (e.g., the on-chip memory 1212', the on-chip memory 1232', and/or the on-chip memory 1242') and/or the additional memory modules (e.g., the additional memory modules 1214, the additional memory modules 1234, and/or the additional memory modules 1244) may each be considered a computer-readable medium/memory. Each computer-readable medium/memory may be non-transitory. Each of the CU processor 1212, the DU processor 1232, the RU processor 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the BS channel tracking component 199 is configured to output for transmission, a model configuration indicative of a model condition of a channel between a first network entity and the second network entity for multiple beam pairs separately in multiple tracking sessions, each beam pair of the multiple beam pairs having a separate tracking session of the multiple tracking sessions, the multiple tracking sessions for the multiple beam pairs overlapping in time; and obtain one or more updated parameters for the one or more model configurations for one of the multiple beam pairs based on a variation, observed at the first network entity, of a channel condition in a corresponding tracking session of the multiple tracking sessions.

The channel tracking component 199 may be within one or more processors of one or more of the CU 1210, DU 1230, and the RU 1240. The BS channel tracking component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The network entity 1002 may include a variety of components configured for various functions. For example, the BS channel tracking component 199 may include one or more hardware components that perform each of the blocks of the algorithm in the flowchart of FIG. 11 and/or the aspects performed by the second network entity in any of FIGS. 4-8.

In one configuration, the network entity 1002 includes means for performing any of the aspects of the method of FIG. 11 and/or the aspects performed by the second network entity in any of FIGS. 4-8.

The means may be the BS channel tracking component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Aspects disclosed herein provide techniques for multiple beam tracking and beam management techniques with model-based channel tracking. For example, disclosed techniques may facilitate tracking performance of multiple beam pairs. In some examples, disclosed techniques may facilitate predicting future beam pair performance, such as predicting a beam failure.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network entity, comprising: receiving from a second network entity, a model configuration indicative of a model condition of a channel between the first network entity and the second network entity for multiple beam pairs; and tracking a variation in a channel condition relative to the model condition of the channel based on the model configuration for each of the multiple beam pairs separately in multiple tracking sessions that overlap in time, each beam pair including a transmission beam and a reception beam.

Aspect 2 is the method of aspect 1, further including: transmitting, to the second network entity, one or more updated parameters for the model configuration for one of the multiple beam pairs based on the variation of the channel condition in a corresponding tracking session of the multiple tracking sessions.

Aspect 3 is the method of any of aspects 1 and 2, further including: transmitting an indication of support for a maximum number of simultaneous tracking sessions; and receiving a configuration to perform a number of the multiple tracking sessions that is within the maximum number of simultaneous tracking sessions supported by the first network entity.

Aspect 4 is the method of any of aspects 1 to 3, further including that tracking the variation in the channel condition relative to the model configuration separately for each of the multiple beam pairs includes: tracking, in a first tracking session, a first variation in the channel condition relative to the model configuration for a first beam pair; and tracking, in a second tracking session, a second variation in the channel condition relative to the model configuration for a second beam pair.

Aspect 5 is the method of any of aspects 1 to 4, further including that the first tracking session is based on a first state model set and the second tracking session is based on a second state model set, the first state model set and the second state model set each including one or more state model parameters.

Aspect 6 is the method of any of aspects 1 to 5, further including: receiving a configuration of the first state model set for the first tracking session and the second state model set for the second tracking session.

Aspect 7 is the method of any of aspects 1 to 5, further including that the first state model set and the second state model set are known to the first network entity.

Aspect 8 is the method of any of aspects 1 to 7, further including: receiving, for different tracking sessions in the multiple tracking sessions, one or more of: a different report configuration, a different threshold, or a different tracking rate for determining the variation in the channel condition relative to the model configuration.

Aspect 9 is the method of any of aspects 1 to 8, further including: determining that a beam pair of the multiple beam pairs has an occurrence of an event in which the channel condition for the beam pair is below a threshold for one or more instances.

Aspect 10 is the method of any of aspects 1 to 9, further including: receiving a request from the second network entity for a set of beam reports based on at least a subset of the multiple beam pairs in response to the event at the beam pair.

Aspect 11 is the method of any of aspects 1 to 9, further including: receiving an indication of a new beam pair, the indication of the new beam pair indicating a replacement of the beam pair having a lowest beam quality metric; and tracking the variation in the channel condition relative to the model configuration for the new beam pair.

Aspect 12 is the method of any of aspects 1 to 9, further including: receiving a first indication of a new beam pair and a second indication of a first beam pair of the multiple beam pairs being replaced by the new beam pair; and tracking the variation in the channel condition relative to the model configuration for the new beam pair.

Aspect 13 is the method of any of aspects 1 to 9, further including: receiving a request for a measurement report for the beam pair for which the event is detected to have occurred; and transmitting the measurement report in response to the request.

Aspect 14 is the method of any of aspects 1 to 13, further including that the measurement report includes at least one of a layer 1 reference signal received power (L1 RSRP) or a signal to interference and noise ratio (SINR).

Aspect 15 is the method of any of aspects 1 to 9, further including: transmitting, in response to the occurrence of the event, a measurement report for at least the beam pair in addition to an indication of the variation for the channel condition relative to the model configuration.

Aspect 16 is the method of any of aspects 1 to 15, further including: transmitting, in response to the occurrence of the event, a request for a transmission on the beam pair.

Aspect 17 is an apparatus for wireless communication at a first network entity including at least one processor coupled to a memory and configured to implement any of aspects 1 to 16.

In aspect 18, the apparatus of aspect 17 further includes at least one antenna coupled to the at least one processor.

In aspect 19, the apparatus of aspect 17 or 18 further includes a transceiver coupled to the at least one processor.

Aspect 20 is an apparatus for wireless communication at a first network entity including means for implementing any of aspects 1 to 16.

In aspect 21, the apparatus of aspect 20 further includes at least one antenna coupled to the means to perform the method of any of aspects 1 to 16.

In aspect 22, the apparatus of aspect 20 or 21 further includes a transceiver coupled to the means to perform the method of any of aspects 1 to 16.

Aspect 23 is a non-transitory computer-readable storage medium storing computer executable code, where the code, when executed, causes a processor to implement any of aspects 1 to 16.

Aspect 24 is a method of wireless communication at a second network entity, comprising outputting for transmission, one or more model configurations indicative of a model condition of a channel between a first network entity and the second network entity for multiple beam pairs separately in multiple tracking sessions, each beam pair of the multiple beam pairs having a separate tracking session of the multiple tracking sessions, the multiple tracking sessions for the multiple beam pairs overlapping in time; and obtaining one or more updated parameters for the one or more model configurations for one of the multiple beam pairs based on a variation, observed at the first network entity, of a channel condition in a corresponding tracking session of the multiple tracking sessions.

Aspect 25 is the method of aspect 24, further including: obtaining an indication of support of the first network entity for a maximum number of simultaneous tracking sessions;

and outputting for transmission a configuration to perform a number of the multiple tracking sessions that is within the maximum number of simultaneous tracking sessions supported by the first network entity.

Aspect 26 is the method of any of aspects 24 and 25, further including that a first tracking session for a first beam pair of the multiple beam pairs is based on a first state model set and a second tracking session for a second beam pair of the multiple beam pairs is based on a second state model set, the first state model set and the second state model set each including one or more state model parameters.

Aspect 27 is the method of any of aspects 24 to 26, further including: outputting for transmission a configuration of the first state model set for the first tracking session and the second state model set for the second tracking session.

Aspect 28 is the method of any of aspects 24 to 27, further including: outputting for transmission, for different tracking sessions in the multiple tracking sessions, one or more of: a different report configuration, a different threshold, or a different tracking rate for determining the variation in the channel condition relative to the one or more model configurations.

Aspect 29 is the method of any of aspects 24 to 27, further including: outputting for transmission, in response to an occurrence of an event in which the channel condition for at least one beam pair of the multiple beam pairs is below a threshold for one or more instances, a request from the second network entity for a set of beam reports based on at least a subset of the multiple beam pairs in response to the event at the at least one beam pair.

Aspect 30 is the method of any of aspects 24 to 27, further including: outputting for transmission, in response to an occurrence of an event in which the channel condition for at least one beam pair of the multiple beam pairs is below a threshold for one or more instances, an indication of a new beam pair, the indication of the new beam pair indicating a replacement of a beam pair having a lowest beam quality metric.

Aspect 31 is the method of any of aspects 24 to 27, further including: outputting for transmission, in response to an occurrence of an event in which the channel condition for at least one beam pair of the multiple beam pairs is below a threshold for one or more instances, a first indication of a new beam pair and a second indication of a first beam pair of the multiple beam pairs, the new beam pair being a replacement for the first beam pair.

Aspect 32 is the method of any of aspects 24 to 27, further including: outputting for transmission, in response to an occurrence of an event in which the channel condition for at least one beam pair of the multiple beam pairs is below a threshold for one or more instances, a request for a measurement report for the at least one beam pair for which the event is detected to have occurred; and obtaining the measurement report in response to the request.

Aspect 33 is the method of any of aspects 24 to 32, further including that the measurement report includes at least one of a layer 1 reference signal received power (L1 RSRP) or a signal to interference and noise ratio (SINR).

Aspect 34 is the method of any of aspects 24 to 27, further including: obtaining, in response to an occurrence of an event in which the channel condition for at least one beam pair of the multiple beam pairs is below a threshold for one or more instances, a measurement report for the at least one beam pair in addition to an indication of the variation for the channel condition relative to the one or more model configurations.

Aspect 35 is the method of any of aspects 24 to 34, further including: obtaining, in response to an occurrence of an event in which the channel condition for a beam pair of the multiple beam pairs is below a threshold for one or more instances, a request for the transmission on the beam pair.

Aspect 36 is an apparatus for wireless communication at a second network entity including at least one processor coupled to a memory and configured to implement any of aspects 24 to 35.

In aspect 37, the apparatus of aspect 36 further includes at least one antenna coupled to the at least one processor.

In aspect 38, the apparatus of aspect 36 or 37 further includes a transceiver coupled to the at least one processor.

Aspect 39 is an apparatus for wireless communication at a second network entity including means for implementing any of aspects 24 to 35.

In aspect 40, the apparatus of aspect 39 further includes at least one antenna coupled to the means to perform the method of any of aspects 24 to 35.

In aspect 41, the apparatus of aspect 39 or 40 further includes a transceiver coupled to the means to perform the method of any of aspects 24 to 35.

Aspect 42 is a non-transitory computer-readable storage medium storing computer executable code, where the code, when executed, causes a processor to implement any of aspects 24 to 35.

What is claimed is:

1. An apparatus for wireless communication at a first network entity, comprising:
memory; and
at least one processor coupled to the memory and configured to:
receive from a second network entity, a model configuration indicative of a model condition of a channel between the first network entity and the second network entity for multiple beam pairs; and
track a variation in a channel condition relative to the model condition of the channel based on the model configuration for each of the multiple beam pairs separately in multiple tracking sessions that overlap in time, each beam pair including a transmission beam and a reception beam.

2. The apparatus of claim 1, further comprising:
at least one transceiver coupled to the at least one processor, wherein the at least one processor is further configured to:
transmit, to the second network entity, one or more updated parameters for the model configuration for one of the multiple beam pairs based on the variation of the channel condition in a corresponding tracking session of the multiple tracking sessions.

3. The apparatus of claim 1, wherein the at least one processor is further configured to:
transmit an indication of support for a maximum number of simultaneous tracking sessions; and
receive a configuration to perform a number of the multiple tracking sessions that is within the maximum number of simultaneous tracking sessions supported by the first network entity.

4. The apparatus of claim 1, wherein to track the variation in the channel condition relative to the model configuration separately for each of the multiple beam pairs, the at least one processor is further configured to:
track, in a first tracking session, a first variation in the channel condition relative to the model configuration for a first beam pair; and track, in a second tracking session, a second variation in the channel condition relative to the model configuration for a second beam pair.

5. The apparatus of claim 4, wherein the first tracking session is based on a first state model set and the second tracking session is based on a second state model set, the first state model set and the second state model set each including one or more state model parameters.

6. The apparatus of claim 5, wherein the at least one processor is further configured to:
receive a configuration of the first state model set for the first tracking session and the second state model set for the second tracking session.

7. The apparatus of claim 5, wherein the first state model set and the second state model set are known to the first network entity.

8. The apparatus of claim 1, wherein the at least one processor is further configured to:
receive, for different tracking sessions in the multiple tracking sessions, one or more of:
a different report configuration,
a different threshold, or
a different tracking rate for determining the variation in the channel condition relative to the model configuration.

9. The apparatus of claim 1, wherein the at least one processor is further configured to:
determine that a beam pair of the multiple beam pairs has an occurrence of an event in which the channel condition for the beam pair is below a threshold for one or more instances.

10. The apparatus of claim 9, wherein the at least one processor is further configured to:
receive a request from the second network entity for a set of beam reports based on at least a subset of the multiple beam pairs in response to the event at the beam pair.

11. The apparatus of claim 9, wherein the at least one processor is further configured to:
receive an indication of a new beam pair, the indication of the new beam pair indicating a replacement of the beam pair having a lowest beam quality metric; and
track the variation in the channel condition relative to the model configuration for the new beam pair.

12. The apparatus of claim 9, wherein the at least one processor is further configured to:
receive a first indication of a new beam pair and a second indication of a first beam pair of the multiple beam pairs being replaced by the new beam pair; and
track the variation in the channel condition relative to the model configuration for the new beam pair.

13. The apparatus of claim 9, wherein the at least one processor is further configured to:
receive a request for a measurement report for the beam pair for which the event is detected to have occurred; and
transmit the measurement report in response to the request.

14. The apparatus of claim 13, wherein the measurement report includes at least one of a layer 1 reference signal received power (L1 RSRP) or a signal to interference and noise ratio (SINR).

15. The apparatus of claim 9, wherein the at least one processor is further configured to:
transmit, in response to the occurrence of the event, a measurement report for at least the beam pair in addition to an indication of the variation for the channel condition relative to the model configuration.

16. The apparatus of claim 9, wherein the at least one processor is further configured to:
transmit, in response to the occurrence of the event, a request for a transmission on the beam pair.

17. An apparatus for wireless communication at a second network entity, comprising:
memory; and
at least one processor coupled to the memory and configured to:
output for transmission, one or more model configurations indicative of a model condition of a channel between a first network entity and the second network entity for multiple beam pairs separately in multiple tracking sessions, each beam pair of the multiple beam pairs having a separate tracking session of the multiple tracking sessions, the multiple tracking sessions for the multiple beam pairs overlapping in time; and
obtain one or more updated parameters for the one or more model configurations for one of the multiple beam pairs based on a variation, observed at the first network entity, of a channel condition in a corresponding tracking session of the multiple tracking sessions.

18. The apparatus of claim 17, further comprising:
at least one transceiver coupled to the at least one processor, wherein the at least one processor is further configured to:
obtain an indication of support of the first network entity for a maximum number of simultaneous tracking sessions; and
output for transmission a configuration to perform a number of the multiple tracking sessions that is within the maximum number of simultaneous tracking sessions supported by the first network entity.

19. The apparatus of claim 17, wherein a first tracking session for a first beam pair of the multiple beam pairs is based on a first state model set and a second tracking session for a second beam pair of the multiple beam pairs is based on a second state model set, the first state model set and the second state model set each including one or more state model parameters.

20. The apparatus of claim 19, wherein the at least one processor is further configured to:
output for transmission a configuration of the first state model set for the first tracking session and the second state model set for the second tracking session.

21. The apparatus of claim 17, wherein the at least one processor is further configured to:
output for transmission, for different tracking sessions in the multiple tracking sessions, one or more of:
a different report configuration,
a different threshold, or
a different tracking rate for determining the variation in the channel condition relative to the one or more model configurations.

22. The apparatus of claim 17, wherein the at least one processor is further configured to:
output for transmission, in response to an occurrence of an event in which the channel condition for at least one beam pair of the multiple beam pairs is below a threshold for one or more instances, a request from the second network entity for a set of beam reports based on at least a subset of the multiple beam pairs in response to the event at the at least one beam pair.

23. The apparatus of claim 17, wherein the at least one processor is further configured to:
output for transmission, in response to an occurrence of an event in which the channel condition for at least one beam pair of the multiple beam pairs is below a threshold for one or more instances, an indication of a new beam pair, the indication of the new beam pair indicating a replacement of a beam pair having a lowest beam quality metric.

24. The apparatus of claim 17, wherein the at least one processor is further configured to:
output for transmission, in response to an occurrence of an event in which the channel condition for at least one beam pair of the multiple beam pairs is below a threshold for one or more instances, a first indication of a new beam pair and a second indication of a first beam pair of the multiple beam pairs, the new beam pair being a replacement for the first beam pair.

25. The apparatus of claim 17, wherein the at least one processor is further configured to:
output for transmission, in response to an occurrence of an event in which the channel condition for at least one beam pair of the multiple beam pairs is below a threshold for one or more instances, a request for a measurement report for the at least one beam pair for which the event is detected to have occurred; and
obtain the measurement report in response to the request.

26. The apparatus of claim 25, wherein the measurement report includes at least one of a layer 1 reference signal received power (L1 RSRP) or a signal to interference and noise ratio (SINR).

27. The apparatus of claim 17, wherein the at least one processor is further configured to:
obtain, in response to an occurrence of an event in which the channel condition for at least one beam pair of the multiple beam pairs is below a threshold for one or more instances, a measurement report for the at least one beam pair in addition to an indication of the variation for the channel condition relative to the one or more model configurations.

28. The apparatus of claim 17, wherein the at least one processor is further configured to:
obtain, in response to an occurrence of an event in which the channel condition for a beam pair of the multiple beam pairs is below a threshold for one or more instances, a request for the transmission on the beam pair.

29. A method of wireless communication at a first network entity, the method comprising:
receiving from a second network entity, a model configuration indicative of a model condition of a channel between the first network entity and the second network entity for multiple beam pairs; and
tracking a variation in a channel condition relative to the model condition of the channel based on the model configuration for each of the multiple beam pairs separately in multiple tracking sessions that overlap in time, each beam pair including a transmission beam and a reception beam.

30. A method of wireless communication at a second network entity, the method comprising:
outputting for transmission, one or more model configurations indicative of a model condition of a channel between a first network entity and the second network entity for multiple beam pairs separately in multiple tracking sessions, each beam pair of the multiple beam pairs having a separate tracking session of the multiple tracking sessions, the multiple tracking sessions for the multiple beam pairs overlapping in time; and
obtaining one or more updated parameters for the one or more model configurations for one of the multiple beam pairs based on a variation, observed at the first network entity, of a channel condition in a corresponding tracking session of the multiple tracking sessions.

* * * * *